(12) United States Patent
Feiner

(10) Patent No.: US 10,364,052 B2
(45) Date of Patent: Jul. 30, 2019

(54) INVENTORY MANAGEMENT SYSTEM

(71) Applicant: POLYMER LOGISTICS (ISRAEL) LTD., Hod Ha'sharon (IL)

(72) Inventor: Gideon Feiner, Ramat Hasharon (IL)

(73) Assignee: POLYMER LOGISTICS (ISRAEL) LTD., Hod Ha'Sharon (IL)

( * ) Notice: Subject to any disclaimer, the term of this patent is extended or adjusted under 35 U.S.C. 154(b) by 0 days.

(21) Appl. No.: 15/834,122

(22) Filed: Dec. 7, 2017

(65) Prior Publication Data

US 2019/0177012 A1 Jun. 13, 2019

(51) Int. Cl.
*B65B 1/46* (2006.01)
*G06Q 50/28* (2012.01)

(52) U.S. Cl.
CPC .............. *B65B 1/46* (2013.01); *G06Q 50/28* (2013.01)

(58) Field of Classification Search
CPC combination set(s) only.
See application file for complete search history.

(56) References Cited

U.S. PATENT DOCUMENTS

| | | | |
|---|---|---|---|
| 5,920,480 A * | 7/1999 | Nakamura | B21D 43/20 414/902 |
| D779,827 S * | 2/2017 | Feiner | D3/307 |
| 2003/0040885 A1 * | 2/2003 | Schoess | G01G 3/16 702/173 |
| 2005/0060246 A1 | 3/2005 | Lastinger et al. | |
| 2006/0208893 A1 * | 9/2006 | Anson | G08B 13/1472 340/572.1 |
| 2007/0050271 A1 | 3/2007 | Ufford et al. | |
| 2007/0174148 A1 * | 7/2007 | Schuler | G06Q 10/087 705/28 |
| 2008/0077510 A1 | 3/2008 | Dielemans | |
| 2009/0234495 A1 * | 9/2009 | Pandit | G06Q 10/08 700/217 |
| 2014/0201041 A1 | 7/2014 | Meyer | |
| 2015/0183552 A1 * | 7/2015 | Kelly | B65D 71/70 206/433 |
| 2017/0186124 A1 * | 6/2017 | Jones | G06Q 10/06311 |
| 2017/0344934 A1 * | 11/2017 | Millhouse | G06Q 10/083 |
| 2018/0038991 A1 * | 2/2018 | Chennakeshu | G01S 17/08 |
| 2018/0137086 A1 * | 5/2018 | Stolpman | G01V 8/10 |

* cited by examiner

*Primary Examiner* — Kyle O Logan
(74) *Attorney, Agent, or Firm* — Mark M. Friedman

(57) ABSTRACT

An inventory management system includes a floor-based weighing subsystem and a load status subsystem. The floor-based weighing subsystem includes a sensor arrangement that includes at least one weight sensor functionally associated with a load carrying unit that supports a load having an associated weight. The load carrying unit is deployed at the floor of a retail display area, and the weight sensor determines the weight of the load. A load status determination engine of the load status subsystem receives, from the floor-based weighing subsystem, the weight of the load determined by the weight sensor, and determines a loading status of the load carrying unit based on the received weight of the load.

23 Claims, 13 Drawing Sheets

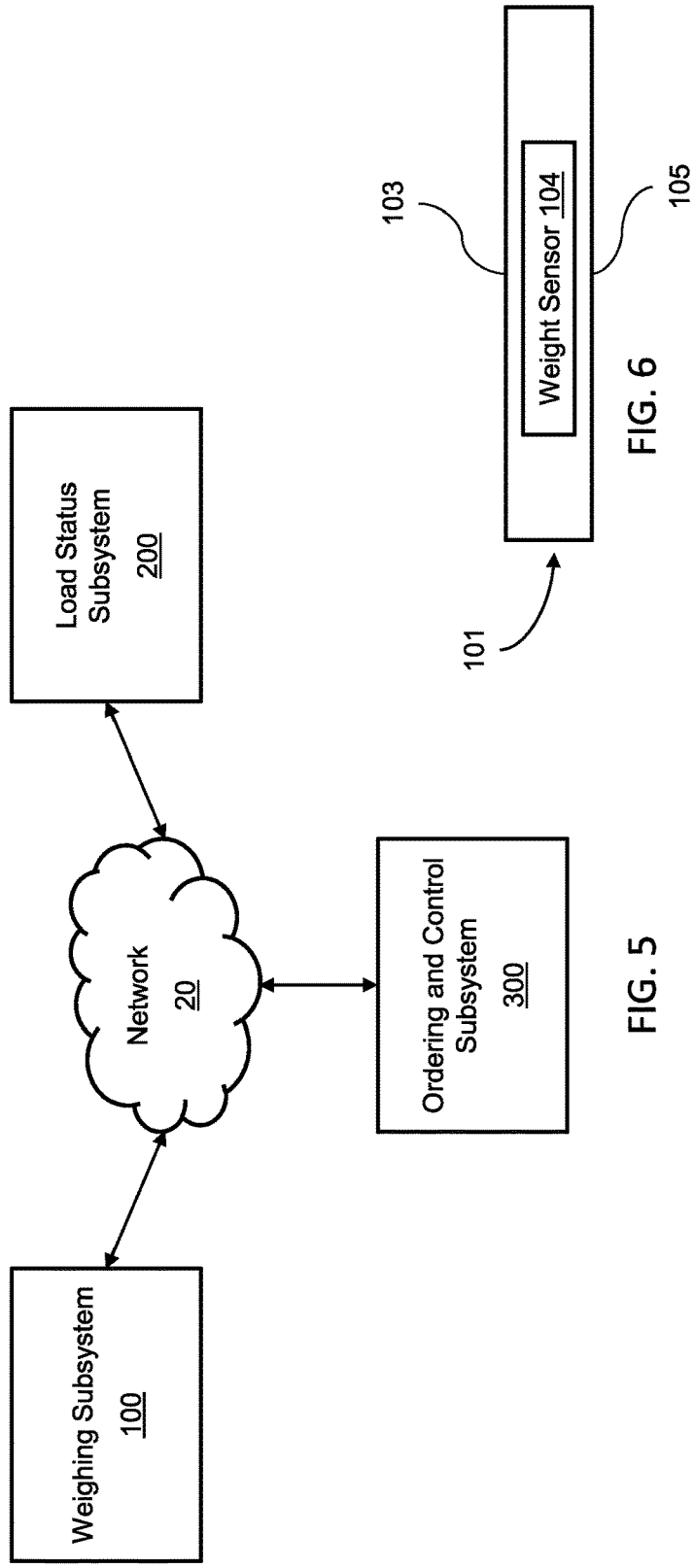

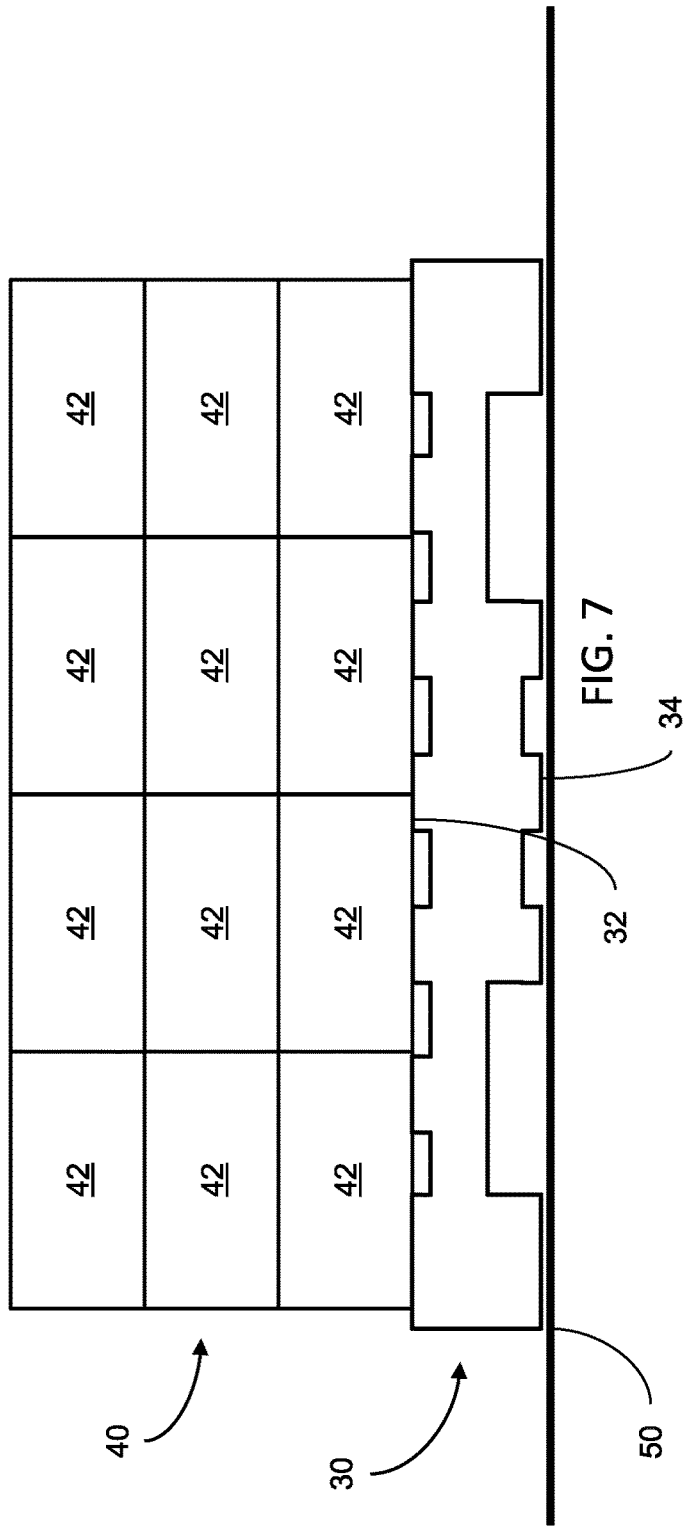

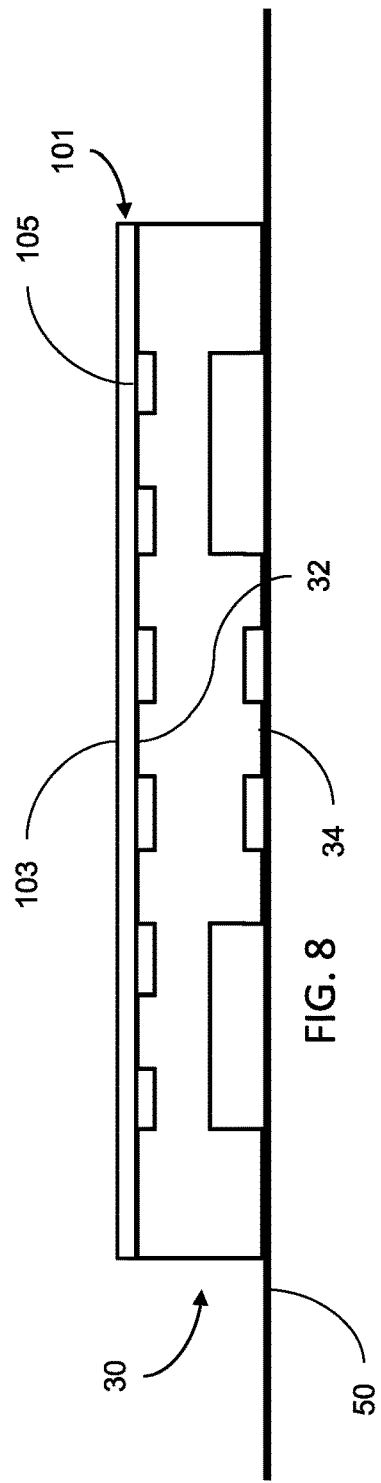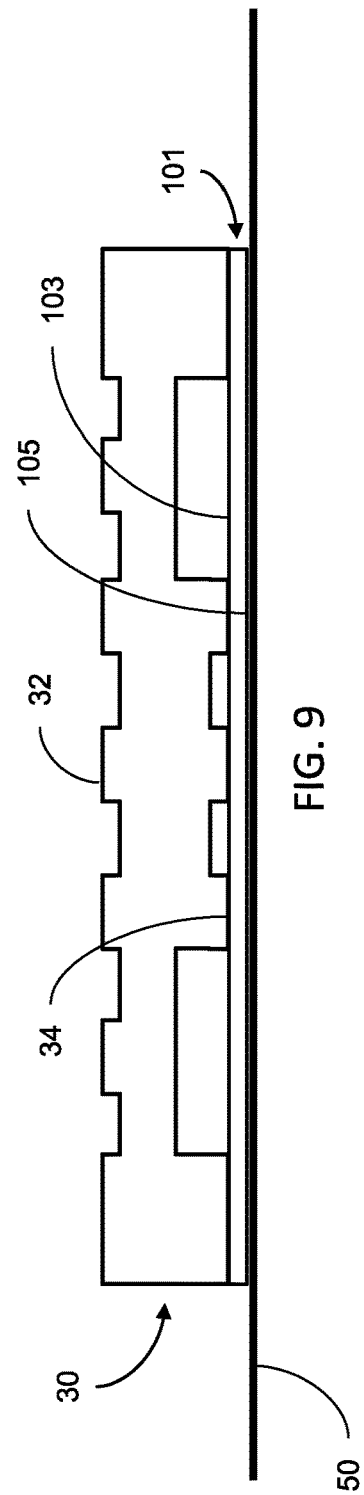

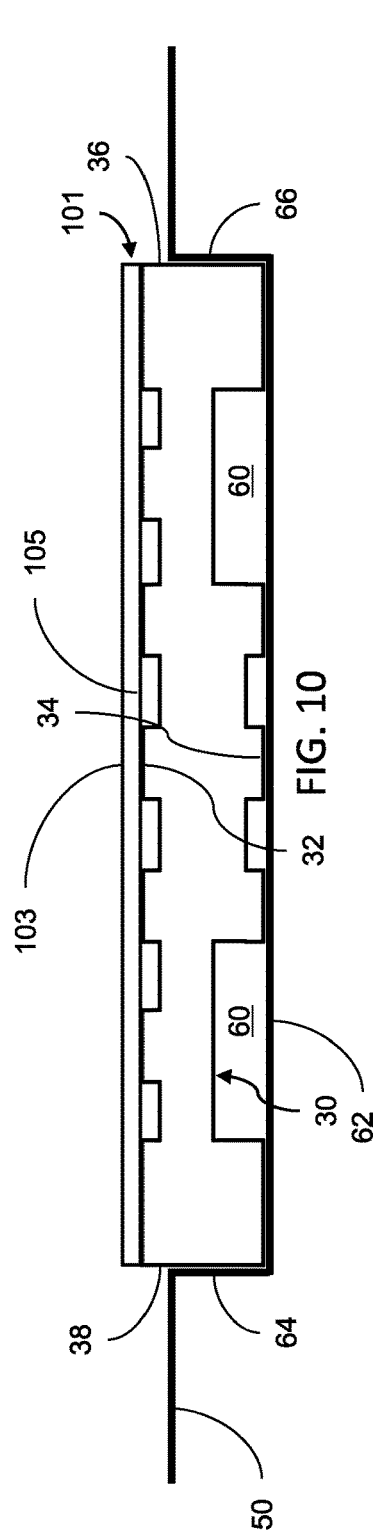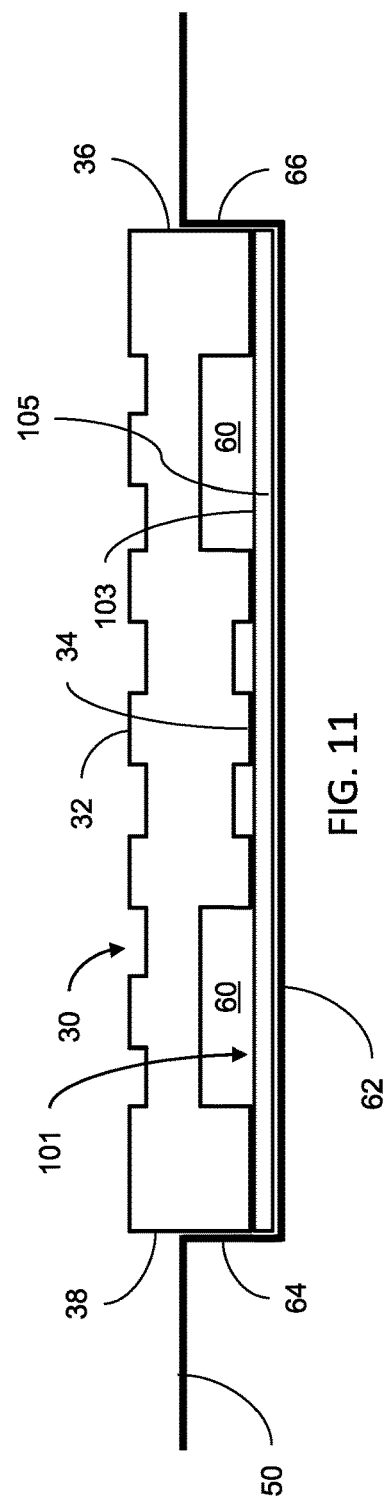

| Pallet ID 1302 | Sensor Position 1304 | Unloaded Weight (kg) 1306 | Fully-Loaded Weight (kg) 1308 | Merchandise Type 1310 | Number of Units 1312 | Items per Unit 1314 | Weight per Unit (kg/unit) 1316 | Weight per Item (kg/unit) 1318 |
|---|---|---|---|---|---|---|---|---|
| P1 | Upper | 0 | 1320 | Bottled Beverage | 100 | 6 | 13.2 | 2 |

INVENTORY MANAGEMENT SYSTEM

TECHNICAL FIELD

The present invention relates to systems for managing inventory of merchandise.

BACKGROUND OF THE INVENTION

In sales of consumer merchandise in retail locations, such as grocery stores, the merchandise is typically displayed on shelving units for removal by customers during shopping. Certain items arrive via delivery on load carrying units, such as, for example, shipping pallets, and are manually removed from the load carrying units and placed on the shelving units. Such load carrying units 30, implemented, for example, in FIGS. 1A-1D as various shipping pallets and dollies, provide a generally flat transport structure which can support a stacked configuration of merchandise 40, as illustrated in FIGS. 2A and 2B, in a stable manner during transporting and unloading. To conserve shelf space, the load carrying units may be placed in a retail display area on the sales floor, so that the merchandise is displayed on the load carrying unit for removal by customers during shopping. However, tracking the stock situation of the merchandise displayed on load carrying units requires manual inspection by employees of the retail store, reducing the efficiency of merchandise.

SUMMARY OF THE INVENTION

The present invention is a system and corresponding components for providing functionality for managing inventory of merchandise.

According to the teachings of an embodiment of the present invention, there is provided an inventory management system. The inventory management system comprises: a floor-based weighing subsystem comprising a sensor arrangement including at least one weight sensor functionally associated with a load carrying unit supporting a load having an associated weight, the load carrying unit deployed at the floor of a retail display area, and the weight sensor determining the weight of the load; and a load status subsystem comprising a load status determination engine including at least one processor coupled to a storage medium, the load status determination engine configured to: receive, from the floor-based weighing subsystem, the weight of the load determined by the weight sensor, and determine a loading status of the load carrying unit based on the received weight of the load.

Optionally, the load status determination engine is further configured to: send a request to replace the load carrying unit in response to at least one event, the at least one event including the determined loading status of the load carrying unit satisfying a threshold criterion.

Optionally, the load status determination engine is further configured to: determine a load depletion rate based on the determined loading status.

Optionally, the at least one event further includes the load depletion rate satisfying a threshold criterion.

Optionally, the at least one event is derived from at least one of temporal data associated with the retail display area, temporal data associated with the location of the retail display area, and occupancy of the retail display area.

Optionally, the weight sensor is carried by a surface of the load carrying unit.

Optionally, the surface of the load carrying unit is a furthest surface of the load carrying unit from the floor.

Optionally, the surface of the load carrying unit is a nearest surface of the load carrying unit to the floor.

Optionally, at least one surface of the load carrying unit is positioned in a recess in the floor, the recess defined in part by a recess surface.

Optionally, the weight sensor is interposed between the recess surface and the at least one surface of the load carrying unit.

Optionally, the weight sensor is positioned outside of the recess.

Optionally, the weight sensor is positioned in a recess in the floor defined in part by a recess surface.

Optionally, the inventory management system further comprises: a stocking and control subsystem configured to receive, from the load status subsystem, an actuation command to take at least one action in response to the determined loading status of the load carrying unit.

Optionally, the inventory management system further comprises a database storing weight information associated with the load and the load carrying unit. Optionally, the weight information associated with the load carrying unit includes an unloaded weight of the load carrying unit and a fully-loaded weight of the load carrying unit.

Optionally, the weight information associated with the load includes a list of load types, and for each load type, a mapping between weight and a number of units of the load.

Optionally, the load status determination engine is further configured to: receive, from the database, weight information associated with the load and the load carrying unit.

Optionally, the weight information associated with the load carrying unit includes an unloaded weight of the load carrying unit and a fully-loaded weight of the load carrying unit, and the loading status of the load carrying unit determined, by the load status determination engine, as a percentage of remaining load supported by the load carrying unit based on the unloaded weight and the fully-loaded weight of the load carrying unit.

Optionally, the weight information associated with the load includes a list of load types, and for each load type, a mapping between weight and a number of units of the load, and the loading status of the load carrying unit determined, by the load status determination engine, by correlating the weight of the load with the number of units of the load based on the mapping.

Optionally, the load includes a bottled beverage product.

There is also provided according to an embodiment of the teachings of the present invention a method for managing inventory. The method comprises: deploying a load carrying unit at the floor of a retail display area, the load carrying unit supporting a load having an associated weight; determining, by at least one weight sensor functionally associated with the load carrying unit, the associated weight of the load; receiving the weight of the load determined by the at least one sensor; and determining a loading status of the load carrying unit based on the received weight of the load.

Optionally, the method further comprises: sending a request to replace the load carrying unit in response to at least one event, the at least one event including the determined loading status of the load carrying unit satisfying a threshold criterion.

There is also provided according to an embodiment of the teachings of the present invention an inventory management system. The inventory management system comprises: a load carrying unit deployed at the floor of a retail display area, the load carrying unit supporting a load having an associated weight; a sensor arrangement including at least one weight sensor functionally associated with the load carrying unit, the weight sensor determining the weight of the load; and a load status subsystem comprising a load status determination engine including at least one processor coupled to a storage medium, the load status determination engine configured to: receive, from the floor-based weighing subsystem, the weight of the load determined by the weight sensor, and determine a loading status of the load carrying unit based on the received weight of the load.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 5 is a diagram illustrating a networked environment in which the inventory management system according to an embodiment of the invention is deployed;

FIG. 6 is a schematic representation of a weight sensor of the weighing subsystem retained in a housing;

FIG. 7 is a schematic side view illustrating a load carrying unit supporting a load of merchandise, similar to FIGS. 2A and 2B;

FIG. 8 is a schematic side view illustrating a load carrying unit deployed on a floor of a retail display area and carrying the weight sensor of the weighing subsystem on an upper surface of the load carrying unit, according to an embodiment of the invention;

FIG. 9 is a schematic side view illustrating a load carrying unit deployed on a floor of a retail display area and carrying the weight sensor of the weighing subsystem under a lower surface of the load carrying unit, according to an embodiment of the invention;

FIG. 10 is a schematic side view illustrating a load carrying unit deployed in a recess of a floor of a retail display area and carrying the weight sensor of the weighing subsystem on an upper surface of the load carrying unit, according to an embodiment of the invention;

FIG. 11 is a schematic side view illustrating a load carrying unit deployed in a recess of a floor of a retail display area and carrying the weight sensor of the weighing subsystem under a lower surface of the load carrying unit, according to an embodiment of the invention;

DESCRIPTION OF THE PREFERRED EMBODIMENTS

The present invention is a system and corresponding components for providing functionality for managing inventory of merchandise.

The principles and operation of the system according to the present invention may be better understood with reference to the drawings accompanying the description.

Figure 3:
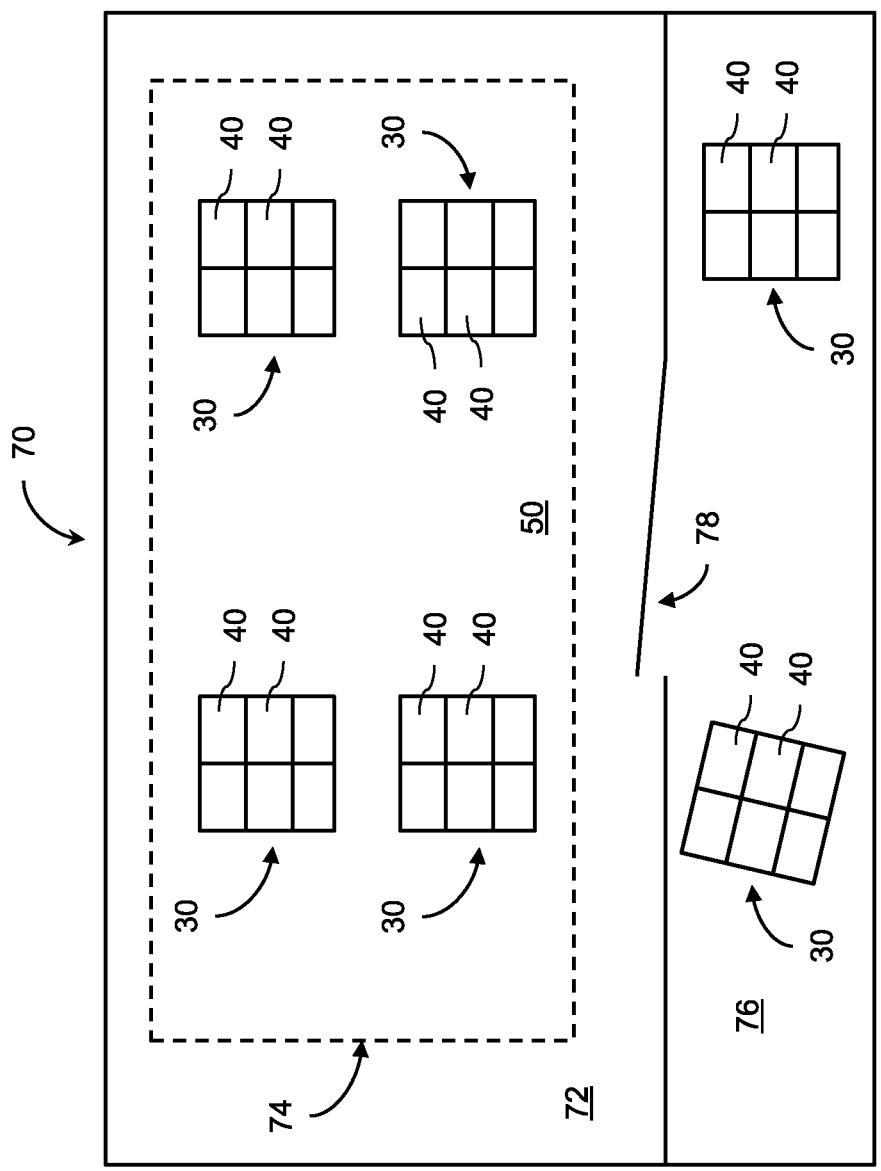
FIG. 3 is a schematic plan view of a retail store with which an inventory management system according to an embodiment of the invention can be used.

The present invention is applicable for use with various types of retail environments, and is of particular when used or implemented in a retail store 70, for example, a grocery stores, having a retail display area 74 on a sales floor 72, as illustrated in FIG. 3. The present invention is also applicable for use with various types of merchandise and products which can be delivered in delivery vessels (e.g., shipping pallets, crates, boxes, etc.) via, for example, delivery trucks, and displayed on the sales floor on a load carrying unit in a retail display area, for direct removal by customers. Such types of merchandise include, but are not limited to, boxed goods (e.g., breakfast cereals), bulk household items (e.g., toilet paper and paper towels), flour, sugar, diapers, and other types of products which can be easily removed by a customer. The present invention is of particular value when the merchandise is a bottled beverage product, such as a soft drink, which arrives in large units, for example boxes or cases of six or more bottles of liquid of 1.5 or 2 liters.

Figure 1B:
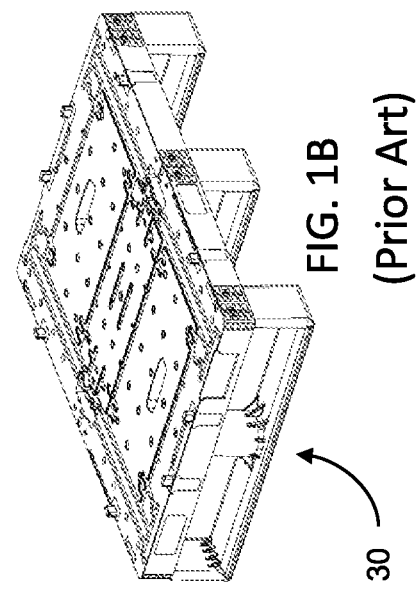
FIGS. 1A-1D are functional representations of various implementations of a load carrying unit, as known in the prior art, used for transporting and supporting a load of merchandise.
Figure 1D:
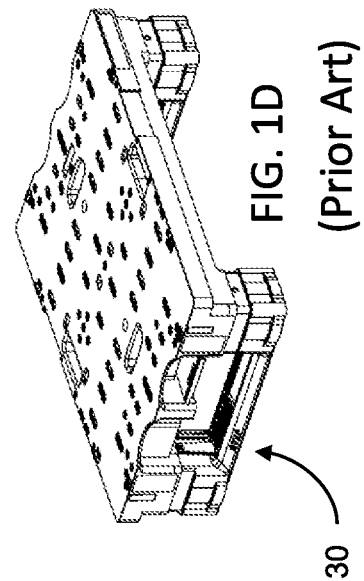
Figure 1A:
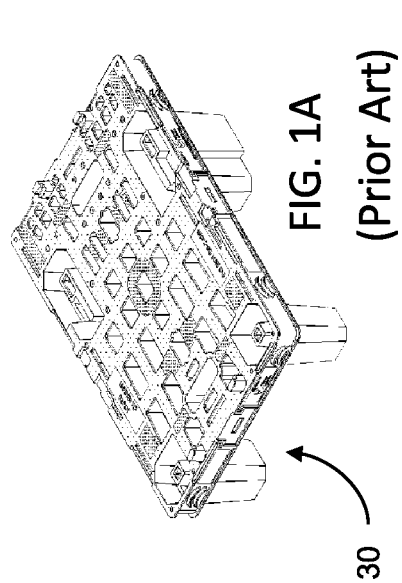
Figure 1C:
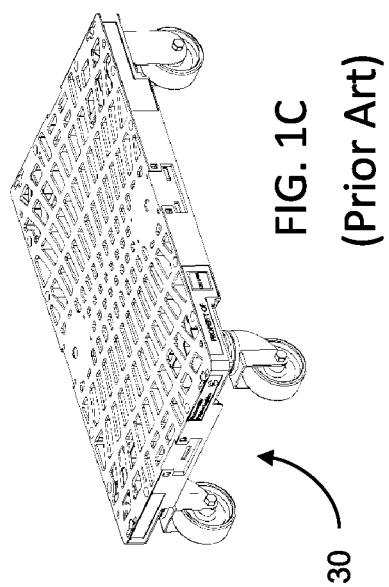
Figure 2B:
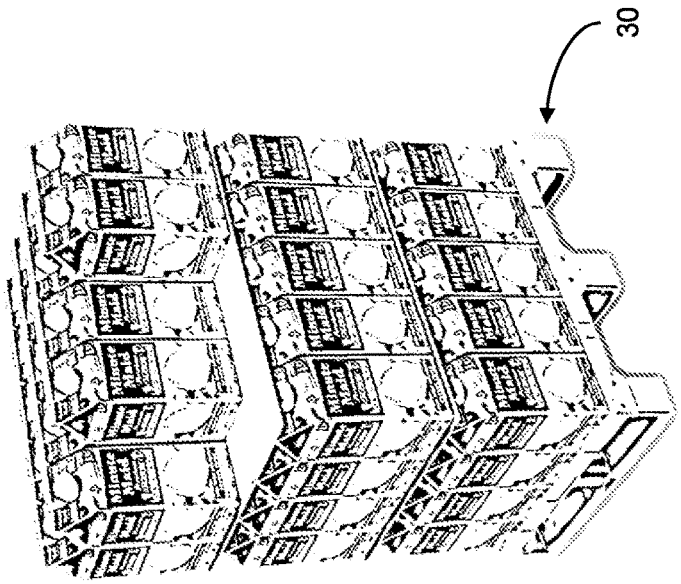
FIGS. 2A and 2B are functional representations of a load carrying unit, similar to the load carrying unit of FIG. 1C, supporting a load of merchandise.
Figure 2A:
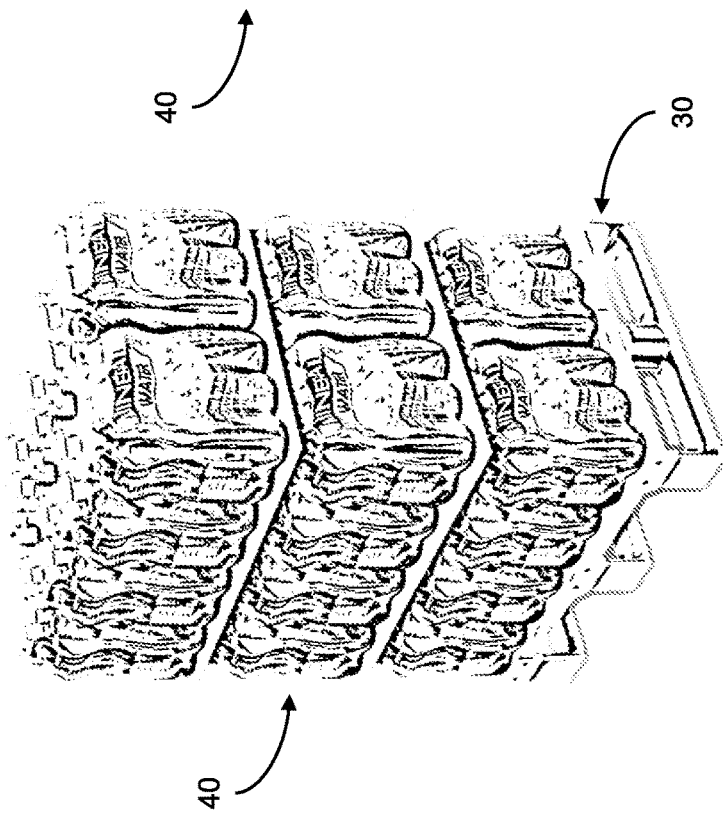

Within the context of this document, the term "load carrying unit" generally refers to any device or structure that provides a generally flat transport structure which can support a load, for example, merchandise 40, in a stable manner during transporting and unloading. Examples of load carrying units include, but are not limited to, pallets, such as, for example, the pallets illustrated in FIGS. 1A and 1B, dollies, such as, for example, the dolly illustrated in FIG. 1C, pallet-dolly combinations, such as, for example, the pallet-dolly illustrated in FIG. 1D, crates, boxes, and any stable combined stacked configuration thereof, for example, a pallet stacked on top of a dolly.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways. Initially, throughout this document, references are made to directions such as, for example, top and bottom, upper and lower, and the like. These directional references are exemplary only to illustrate the invention and embodiments thereof.

Referring now to the drawings, and with continued reference to FIGS. 1-3, FIG. 4 shows a block diagram of a system, generally designated 10, that provides functionality for managing inventory of a load of merchandise 40 supported and displayed on a load carrying unit 30 deployed in the retail display area 74 on the sales floor 72 of a retail store 70. Generally speaking, the system 10 includes a weighing subsystem 100, a load status subsystem 200, and a stocking and control subsystem 300. The components of the system 10 operate to periodically or intermittently determine a loading status of the load carrying unit 30 as customers remove the merchandise 40 from the load carrying unit 30.

The weighing subsystem 100, the load status subsystem 200, and the stocking and control subsystem 300 are linked to each other via a communication network which may be wireless or wired. FIG. 5 shows an illustrative example environment in which embodiments of the system 10 of the present disclosure may be performed over such a communication network, generally designated as network 20. The network 20 may be formed of one or more networks, including for example, the Internet, cellular networks, wide area, public, and local networks.

According to certain embodiments, the major components of the system 10 are located in separate geographic areas. For example, the weighing subsystem 100 or components thereof may be removably interfaced with the load carrying unit 30 or integrated as part of the load carrying unit 30 such that it is carried by the load carrying unit 30, and may therefore travel and move with the load carrying unit 30, while the load status subsystem 200 may be deployed in a managing office of the retail store 70 at which the load carrying unit 30 is displayed, and the stocking and control subsystem 300 may be deployed in a central office for managing inventory and supply chain. In other embodiments, one or more components of the system 10 may be co-located with each other. For example, the load status subsystem 200 and the stocking and control subsystem 300 may be deployed in a single shared location, for example in a central office for managing inventory and supply chain, while the weighing subsystem 100 may be removably interfaced with the load carrying unit 30 or integrated as part of the load carrying unit 30. In another example, the load weighing subsystem 100 and the load status subsystem 200 may be removably interfaced with the load carrying unit 30 or integrated with the load carrying unit 30 such that they are both carried by the load carrying unit 30.

Figure 4:
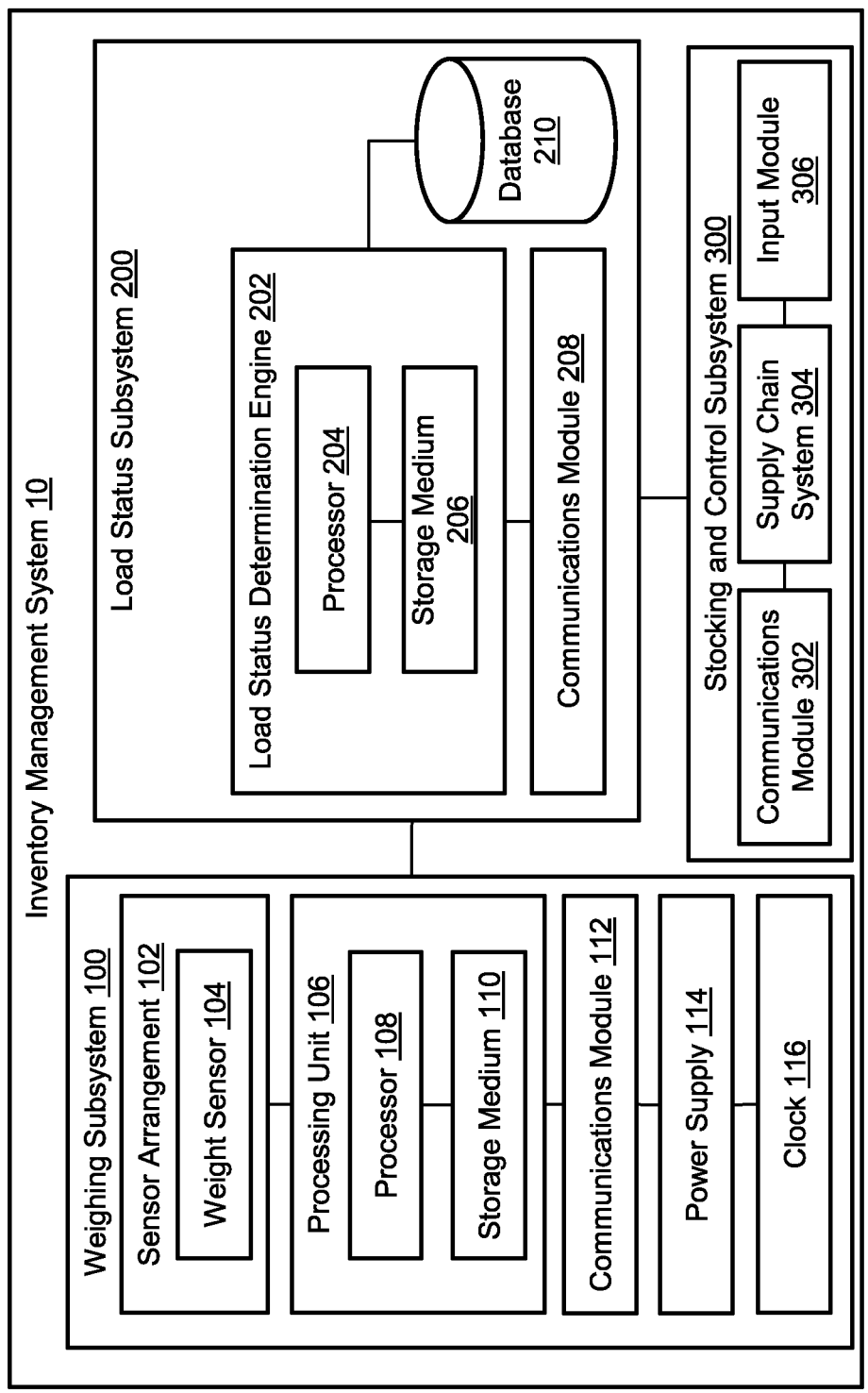
FIG. 4 is a block diagram of an inventory management system that includes a weighing subsystem, a load status subsystem, and a stocking and control subsystem, according to an embodiment of the invention.

With continued reference to FIG. 4, the weighing subsystem 100 includes a sensor arrangement 102 that includes a weight sensor 104 for collecting data from the load carrying unit 30 to determine (i.e., measure) the weight of the load of the merchandise 40, that is supported by the load carrying unit 30, by providing electrical signals indicative of weight. Although the weight sensor 104 is illustrated in FIG. 4 as a single sensor, in certain embodiments the weight sensor 104 may be realized as more than one sensor for determining weight. The weight sensor 104 can be implemented in various ways, including for example, as a transducer that creates electrical signals having magnitude directly proportional to the force applied to the weight sensor 104 (i.e., the weight being measured). Some of such transducer implementations are commonly referred to as load cells, which can utilize piezoelectric material to generate the voltage of the electrical signals. Alternatively, the weight sensor 104 may be implemented as a pressure sensor, which may also utilize transducers together with piezoelectric material, to create electrical signals having magnitude directly proportional to applied pressure.

It is noted herein that although the component for collecting data to determine (i.e., measure) load weight is referred to as a weight sensor, within the context of this document, the term "weight sensor" generally refers to any device or sensor that can be used to measure or determine the weight of an object, and should not be limited to a specific implementation unless explicitly stated otherwise.

As illustrated in FIG. 6, the weight sensor 104 is preferably retained in a housing 101, such as a pad or the like, that includes an upper contact surface 103 (e.g., a contact pad having a contact zone) onto which force is applied by the item to be weighed, and an oppositely disposed bottom surface 105. The housing 101 allows physical attachment of the sensor arrangement 102 to the load carrying unit 30, as will be discussed in subsequent sections of the present disclosure.

The sensor arrangement 102 is coupled to a processing unit 106 that includes at least one processor 108 coupled to a storage medium 110 such as a memory or the like. The processing unit 106 receives the electrical signals produced by the weight sensor 104 and processes such signals to obtain the weight of the load of the merchandise 40 that is supported by the load carrying unit 30. The processing unit 106 actuates a communications module 112 of the weighing subsystem 100 to transmit signals representative of the obtained weight to the load status subsystem 200 in order to determine the stock status of the merchandise 40. Description of the components of the load status subsystem 200 and the process for determining the stock status of the merchandise 40 will be provided in detail in subsequent sections of the present disclosure.

The weighing subsystem 100 further includes a clock 116, which can be utilized to provide time and/or date information to the components of the system 10, and in certain embodiments, is used by the processing unit 106 to time tag the data collected by the weight sensor 104. A power supply 114, which may be implemented, for example, as a battery power supply, provides power to the sensor arrangement 102, the processing unit 106, and the communications module 112. All of the components of the weighing subsystem 100 are connected or linked to each other (electronically and/or data) wither directly or indirectly.

According to certain embodiments, elements of the sensor arrangement 102, in particular the weight sensor 104, are removably interfaced with the load carrying unit 30 or integrated with the load carrying unit 30 such that the load carrying unit 30 carries the weight sensor 104. In such embodiments, the weight sensor 104 is positioned relative to a surface of the load carrying unit 30, which may be an upper surface 32 or a lower surface 34 of the load carrying unit 30, as illustrated in FIG. 7. As discussed above, the weight sensor 104 is positioned in a housing 101 which allows physical attachment of the weight sensor 104 to the appropriate surface of the load carrying unit 30.

The following paragraphs describe various configurations of the weight sensor 104 removably interfaced with the load carrying unit 30 or integrated with the load carrying unit 30, and various deployment configurations of the load carrying unit 30 in the retail display area 74. In such configurations, the weight sensor 104 and the load carrying unit 30 move jointly as the weight sensor 104 is carried by the load carrying unit 30.

With continued reference to FIGS. 1-7, refer now to FIGS. 8 and 9, the housing 101 of the weight sensor 104 positioned relative to surfaces of the load carrying unit 30, according to an embodiment of the system 10 of the present disclosure. In FIG. 8, the housing 101 of the weight sensor 104 is positioned on the upper surface 32 of the load carrying unit 30, which as illustrated in FIG. 7, defines a receiving surface onto which the merchandise 40, illustrated in a stacked arrangement of merchandise cases 42, is placed. The bottom surface 105 of the housing 101 is removably interfaced with the top of the upper surface 32, which in a non-limiting implementation is effectuated by resting the bottom surface 105 of the housing 101 on top of the upper surface 32. In another embodiment, the weight sensor 104 is integrated with the load carrying unit 30 by securing the bottom surface 105 of the housing 101 to the top of the upper surface 32, which in a non-limiting implementation is made via adhesive bonding or the like. The configuration renders the contact surface 103 as the receiving surface onto which the merchandise 40 is placed, and renders the lower surface 34 as the surface of the load carrying unit 30 that is closest to, and is in contact with, the floor 50 of the retail display area 74 of the sales floor 72.

In FIG. 9, the housing 101 of the weight sensor 104 is positioned below or under the lower surface 34 of the load carrying unit 30, which as illustrated in FIG. 7, typically defines a surface of the load carrying unit 30 that is closest to, and is in contact with, the floor 50. The contact surface 103 is removably interfaced with the bottom side of the lower surface 34, which in a non-limiting implementation, is effectuated by placement of the housing 101 on the floor 50 and resting the bottom of the lower surface 34 on the contact surface 103. In another embodiment, the weight sensor 104 is integrated with the load carrying unit 30 by securing the bottom of the lower surface 34 on the contact surface 103, which in a non-limiting implementation is made via adhesive bonding or the like. In such a configuration, portions of the load carrying unit 30 apply force to the contact surface 103. The merchandise 40 received by the upper surface 32 applies an additional force to the load carrying unit 30 resulting in a total force applied by the load carrying unit 30 when loaded with the merchandise 40. The total combined force consists of the force applied by the load carrying unit 30 when unloaded and the force applied by the merchandise 40. As illustrated in FIG. 9, the upper surface 32 defines the receiving surface onto which the merchandise 40 is placed, and the bottom surface 105 is the surface of the housing 101 that is closest to, and is in contact with, the floor 50.

Note that in the configurations described above with reference to FIGS. 8 and 9, the upper and lower surfaces 32, 34 may include apertures or slits, for example, as illustrated in FIGS. 1A-1D, potentially rendering the upper and lower surfaces 32, 34 as non-contiguous surfaces. Alternatively, the load carrying unit 30 may be constructed from multiple upper parallel portions, each portion having an upper surface that is co-planar with the upper surface of the other upper parallel portions. Similarly, the load carrying unit 30 may be constructed from multiple lower parallel portions, each portion having a lower surface that is co-planar with the lower surface of the other lower parallel portions.

The embodiments of the system 10 as described thus far have pertained to deployment of the load carrying unit 30 on or above the floor 50 of a retail display area, however, other embodiments are possible in which the load carrying unit 30 is deployed in a recess of the floor 50, which provides a dedicated space in the retail display area for the load carrying unit 30 to be positioned. Refer now to FIGS. 10 and 11, deployment of the load carrying unit 30 in a recess 60 of the floor 50 in the retail display area 74. The recess 60 is defined by a recessed surface 62 and two side surfaces 64, 66. The recessed surface 62 is in a plane parallel to the floor 50 and at a depth relative to the floor 50 of between approximately 5-30 centimeters (cm). The recess 60 and the footprint of the load carrying unit 30 are correspondingly dimensioned, such that when the load carrying unit 30 is positioned in the recess 60, opposing sides 36, 38 of the load carrying unit 30 are proximate to respective side surfaces 66, 64 forming an abutment or a near abutment with respective side surfaces 66, 64.

In FIG. 10, the housing 101 of the weight sensor 104 is positioned on the upper surface 32 of the load carrying unit 30, and the bottom surface 105 of the housing 101 is removably interfaced with, or secured to the top of, the upper surface 32, similar to as described above with reference to FIG. 8. In addition, the lower surface 34 of the load carrying unit 30 is recessed in the floor 50 such that the lower surface 34 is the surface of the load carrying unit 30 that is closest to, and is in contact with, the recessed surface 62.

In FIG. 11, the housing 101 of the weight sensor 104 is positioned below or under the lower surface 34 of the load carrying unit 30, and the contact surface 103 is secured to the bottom side of the lower surface 34, similar to as described above with reference to FIG. 9. In addition, the bottom surface 105 is recessed in the floor 50 such that the bottom surface 105 is the surface of the housing 101 that is closest to, and is in contact with, the recessed surface 62.

Figure 12:
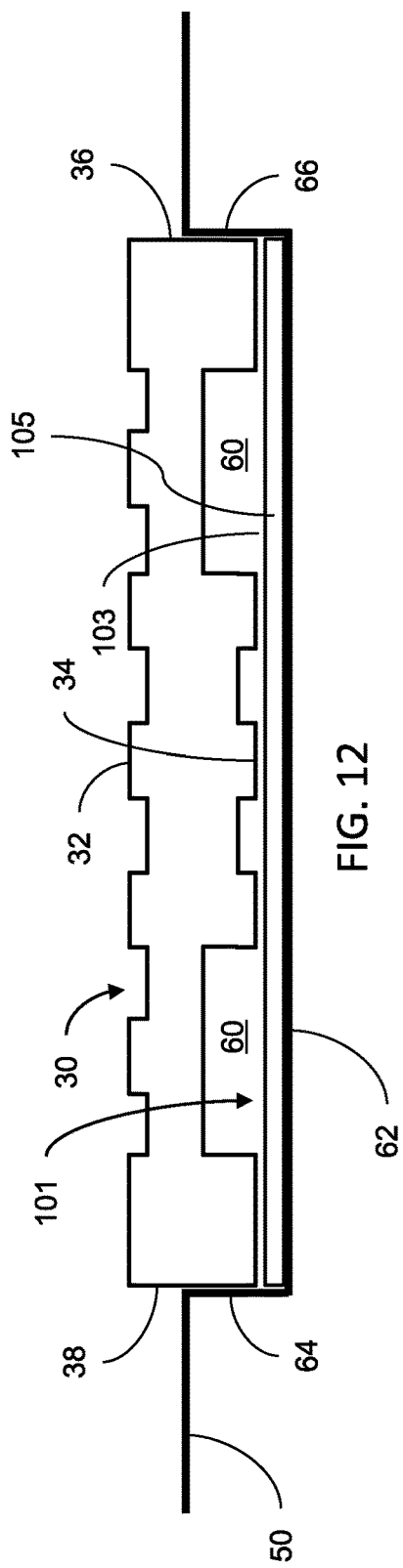
FIG. 12 is a schematic side view illustrating the weight sensor of the weighing subsystem positioned in a recess of a floor of a retail display area and a load carrying unit positioned on top of the sensor arrangement, according to an embodiment of the invention.

FIG. 12 illustrates a configuration similar to FIG. 11, except the housing 101 is removably interfaced with the load carrying unit 30 by positioning the housing 101 in the recess 60 independent from the load carrying unit 30. Therefore, the weight sensor 104 and can be maintained in the recess 60 prior to positioning the load carrying unit 30 in the recess 60 or subsequent to removing the load carrying unit 30 from the recess 60.

Although embodiments are possible in which some or all of the components of the weighing subsystem 100, for example the weight sensor 104, are integrated as part of the load carrying unit 30, such embodiments may not be cost effective due to the need of weighing subsystem components per load carrying unit. Therefore, in preferred embodiments, the same weighing subsystem 100 is deployed for use with multiple load carrying units as individual load carrying units are removed from, and replaced in, the retail display area 74.

Note that the thickness of the housing 101 as depicted in FIGS. 8-12 is exaggerated, in order to more clearly illustrate the relative positioning of the housing 101, the load carrying unit 30, the floor 50, and the recess 60. Further note that the housing 101, and in particular the contact surface 103, is preferably dimensioned to correspond to the perimeter dimensions of the upper surface 32 and/or the lower surface 34 of the load carrying unit 30, such that the weight of items positioned on any portion on the top side of the load carrying unit 30, either directly on the upper surface 32 or on contact surface 103, can be accurately measured by the weight sensor 104. As mentioned above, in certain embodiments the weight sensor 104 may be realized as more than one sensor for determining weight. In such embodiments, each of the weight sensors may be housed in a separate housing, with each housing being structurally similar to the housing 101. Groups of the weight sensors may be housed in a common housing. Each of the weight sensors may then be deployed in different positions relative to the load carrying unit 30 to cover the entire receiving surface onto which the merchandise 40 is placed. In such embodiments, the processing unit 106 is preferably configured to perform functions to aggregate or combine the electrical signals received from the weight sensors, to obtain the weight of the load of the merchandise 40 that is supported by the load carrying unit 30.

With continued reference to FIGS. 10-12, note that although the upper surface 32 is shown extending above the level of the floor 50, the depth of the recess 60 and the height of the load carrying unit 30 may be correspondingly configured, such that the upper surface 32 of the load carrying unit 30 and the floor 50 are level, or approximately level, when the load carrying unit 30 is positioned in the recess 60. Alternatively, the depth of the recess 60 and the height of the load carrying unit 30 may be correspondingly configured, such that the upper surface 32 of the load carrying unit 30 is several centimeters below the floor 50, to allow customers to more easily access the merchandise 40, in particular the merchandise cases 42 at the top of a stack.

The following paragraphs describe the components of the load status subsystem 200 and the stocking and control subsystem 300, as well as the processes for determining the loading status of the load carrying unit 30.

With continued reference to FIG. 4, the load status subsystem 200 includes a load status determination engine 202 coupled to a communications module 208 that receives the obtained weight from the communications module 112 of the weighing subsystem 100. In embodiments in which the weighing subsystem 100 and the load status subsystem 200 are co-located, the communications modules 112, 208 may be implemented as interconnected data buses which allow the wired transfer of information between the weighing subsystem 100 and the load status subsystem 200. In embodiments in which the weighing subsystem 100 and the load status subsystem 200 are connected via a wired communication network (i.e., the network 20 includes at least one wired network), the communications modules 112, 208 may be implemented to transmit and receive data according to a wired communication protocol, which may include, for example, wired Internet protocols (e.g., TCP/IP). In embodiments in which the weighing subsystem 100 and the load status subsystem 200 are connected via a wireless communication network (i.e., the network 20 includes at least one wireless network, such as, for example, a wireless LAN or cellular network), the communications modules 112, 208 may be implemented to transmit and receive data according to a wireless communication protocol, such as, for example, Wi-Fi (e.g., IEEE802.11b, IEEE802.11g, etc.), cellular network protocols (e.g., CDMA, GSM, etc.), and the like.

The load status determination engine 202 includes at least one processor 204 coupled to a storage medium 206 such as a memory or the like. Note that the processors 108, 204 can be any number of computer processors, including, but not limited to, a microcontroller, a microprocessor, an ASIC, a DSP, and a state machine, configured to perform various functions and processes, including one or more of the processes described in the flow diagrams of FIGS. 14-16. Such processors include, or may be in communication with computer readable media, which stores program code or instruction sets that, when executed by the processor, cause the processor to perform actions. Such instruction sets may include, for example, instructions for executing one or more of the processes described in the flow diagrams of FIGS. 14-16. Types of computer readable media include, but are not limited to, electronic, optical, magnetic, or other storage or transmission devices capable of providing a processor with computer readable instructions.

The load status determination engine 202 receives the obtained weight of the load from the weighing subsystem 100, via the communications modules 112, 208, and determines a loading status of the load carrying unit 30 based on the obtained weight of the load. The loading status of the load carrying unit 30 indicates a quantity of merchandise remaining on the load carrying unit 30 which may be provided in various formats, based on information pertaining to the load carrying unit 30 and/or the merchandise 40 supported by the load carrying unit 30.

Figure 13:
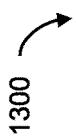
FIG. 13 is a table depicting information related to the load carrying unit and the load of merchandise supported by the load carrying unit, according to an embodiment of the invention.

The information may be stored in any type of storage mediums or device, and in certain embodiments is stored in a structured data format in one or more databases, for example, the database 210. An example of the data records of the database 210 are illustrated in FIG. 13 as a table 1300 of record entries. Note that although FIG. 4 illustrates the database 210 as being part of the load status subsystem 200, the database 210 may alternatively be included in the weighing subsystem 100 or the stocking and control subsystem 300, or may be separate from the weighing subsystem 100, the load status subsystem 200 and the stocking and control subsystem 300, and provided on a remote server (e.g., a cloud server) that is accessible by the load status subsystem 200 through the network 20.

Although not shown in the drawings, the load status subsystem 200 may include a power supply, such as a battery power supply, for providing power to the components of the load status subsystem 200. Note that all of the components of the load status subsystem 200 are connected or linked to each other (electronically and/or data) wither directly or indirectly.

With reference to FIG. 13, according to certain embodiments, the information pertaining to the load carrying unit 30, stored in the database 210, includes a load carrying unit identifier (ID) record 1302 for identifying the specific load carrying unit, a sensor position record 1304 indicating the position of the weight sensor 104 relative to the load carrying unit 30 (e.g., on the upper surface 32 or below the lower surface 34), an unloaded weight record 1306 indicating the unloaded weight of the load carrying unit 30, and a fully-loaded weight record 1308 indicating the fully-loaded weight of the load carrying unit 30. In embodiments in which the weight sensor 104 is positioned below the lower surface 34 of the load carrying unit 30 (e.g., in FIGS. 9, 11 and 12), the weight 1306 may include the weight of the load carrying unit 30 itself, which may be used by the load status determination engine 202 to normalize the weight of the load. The value in the fully-loaded weight record 1308 is typically a function of the size and material of the load carrying unit 30 and may also depend on the type of merchandise supported by the load carrying unit 30. For example, standard wooden pallets of size 48 inches by 40 inches by 6 inches, have a static load bearing capacity of approximately 3 tons, which is slightly more than 2700 kilograms (kg). However, the fully-loaded weight of the load carrying unit 30 may be considerably less than the load bearing capacity. In embodiments in which the merchandise 40 is a bottled beverage product, for example stacked in an arrangement of merchandise cases 42 with each of the cases 42 holding six or more bottles, the fully-loaded weight is a function of the weight of each case 42 and the total number of cases loaded onto the load carrying unit 30. For example, the standard wooden pallet with load bearing capacity of approximately 3 tons can comfortably support 100 bottled beverage cases 42, with each case holding six 2-liter bottles. With each liter of liquid weighing approximately 1 kg, the fully-loaded weight of the load carrying unit 30 is approximately 1320 kg (including the weight of the bottles themselves and the packaging material of the cases 42), which is less than half of the static load bearing capacity.

The value in the fully-loaded weight record 1308 may be filled using information pertaining to the merchandise 40 supported by, and displayed on, the load carrying unit 30. The information pertaining to the merchandise 40 includes a merchandise type record 1310 (e.g., beverage, cereal, etc.), a number of units record 1312 indicating the number of units initially displayed on the load carrying unit 30 when placed on the sales floor, an items per unit record 1314 indicating the number of items per unit, a weight per unit record 1316, and a weight per item record 1318.

With continued reference to FIG. 13, and using the example of the merchandise 40 being a bottled beverage product, the table 1300 illustrates example data records for a row of entries. In the row of entries, the load carrying unit ID record 1302 indicates that the load carrying unit ID is "P1", and the sensor position record 1304 indicates that the weight sensor 104 is positioned on the upper surface 32 of the load carrying unit P1. The unloaded weight record 1306 indicates that the unloaded weight of load carrying unit P1 is 0 kg, while the fully-loaded weight record 1308 indicates that the fully-loaded weight of load carrying unit P1 is 1320 kg. The merchandise type record 1310 indicates that the merchandise supported by load carrying unit P1 is a bottled beverage product. The number of units record 1312 indicates that at the time load carrying unit P1 was deployed on the sales floor, there were 100 units (i.e., 100 boxes or cases) displayed on the load carrying unit. The items per unit record 1314 indicates that there are 6 items in a box or case (i.e., 6 bottles in a box or case) displayed on load carrying unit P1. The weight per unit record 1316 indicates that each unit (i.e., each box or case) displayed on load carrying unit P1 weighs approximately 13.2 kg, and the weight per item record 1318 indicates that each individual bottle displayed on load carrying unit P1 weighs approximately 2 kg.

As can be seen from the entries in the table 1300, the database 210 provides information used to create a mapping between weight and the number of units supported by the load carrying unit 30, based on the record 1316. The load status determination engine 202 can utilize this mapping to specify the quantity of merchandise remaining on the load carrying unit 30 as a number of units remaining on the load carrying unit 30. The number of units remaining on the load carrying unit 30 is determined by the load status determination engine 202 based on the weight of the load received from the weighing subsystem 100 and the mapping between weight and the number of units. For example, for load carrying unit P1, if the weighing system 100 determines a weight of 198 kg, the load status determination engine 202 transforms the received weight of 198 kg to a number of units remaining on load carrying unit P1 by utilizing the mapping which maps weight to the number of units. In the particular example illustrated in FIG. 13, the mapping maps every 13.2 kg to a unit. As a result, the load status determining engine 202 estimates that there are approximately (198 kg)/(13.2 kg/unit)=15 units remaining on load carrying unit P1. The database 210 may also provide information used to create a mapping between the weight and the number of individual items supported by the load carrying unit 30, for example, based on the record 1318.

In certain embodiments, the load status determination engine 202 specifies the quantity of merchandise remaining on the load carrying unit 30 as a percentage of merchandise remaining on the load carrying unit 30, based on the weight of the load received from the weighing subsystem 100 and the unloaded weight of the load carrying unit 30 and the fully-load weight of the load carrying unit 30 (i.e., the records 1306 and 1308). For example, if the weighing system 100 determines a weight of 198 kg, the load status determination engine 202 transforms the received weight of 198 kg to a percentage by dividing the received weight by the difference between the record 1308 and the record 1306. In the particular example illustrated in FIG. 13, a received weight of 198 kg corresponds to (198 kg)/(1320 kg−0 kg)=15% of merchandise remaining on the load carrying unit 30.

According to certain embodiments, the load status determination engine 202 compares the quantity of merchandise remaining on the load carrying unit 30 (as a number of units or as a percentage) with a threshold in order to effectuate efficient re-stocking of the merchandise. This threshold is referred to interchangeably as a re-stocking threshold. In embodiments in which the load status determination engine 202 presents the quantity of merchandise remaining on the load carrying unit 30 as a number of units remaining on the load carrying unit 30, the re-stocking threshold is preferably set to a number of units or a percentage of the value in the record 1312. For example, the re-stocking threshold may be set to 25, or equivalently to 25% of the value in the record 1312 in the table 1300. Continuing with the example above in which the load status determining engine 202 estimates approximately 15 units remaining on the load carrying unit 30, the load status determining engine 202 compares the estimate of 15 units with the re-stocking threshold of 25. In embodiments in which the load status determination engine 202 presents the quantity of merchandise remaining on the load carrying unit 30 as a percentage of merchandise remaining on the load carrying unit 30, the re-stocking threshold is preferably set to a percentage of the value in the record 1308. For example, the re-stocking threshold may be set to 25% of the value in the record 1308, which corresponds to a weight of 380 kg. Continuing with the example above in which the load status determining engine 202 estimates 15% of merchandise remaining on the load carrying unit 30, the load status determining engine 202 compares the estimate of 15% units with the re-stocking threshold of 25%.

In certain embodiments, if the quantity of merchandise remaining on the load carrying unit 30 is below the re-stocking threshold, a re-stocking request is triggered by which the load status determination engine 202 actuates the communications module 208 to send a re-stocking request to a communications module 302 of the stocking and control subsystem 300 in order to re-stock the merchandise. Note that re-stocking the merchandise can be effectuated in various ways, for example, by simply placing additional cases or boxes of the merchandise 40 on the load carrying unit 30 when the quantity of remaining merchandise is below the re-stocking threshold. However, in a preferred embodiment of the system 10 of the present disclosure, the re-stocking is effectuated by replacing the entire load carrying unit with a new load carrying unit supporting and displaying new merchandise.

Typically, the retail store 70 includes a pre-sale storage area 76, separated from the sales floor 72 by a doorway 78, for storing additional merchandise stock, as illustrated in FIG. 3. Accordingly, upon receiving a re-stocking request from the load status subsystem 200, an operator, for example, an employee of the retail store 70, may receive an indication from the stocking and control subsystem 300 to retrieve additional stock form the pre-sale storage area 76 and place the additional stock on the sales floor 72. The indication may be provided in various ways, for example as a visual indication on a video monitor or screen, or as an audio indication via a speaker or intercom system.

In some embodiments, the load status determination engine 202 may compare the quantity of merchandise remaining on the load carrying unit 30 to more than one threshold. For example, a first threshold, referred to interchangeably as a warning threshold, may be set to provide a warning or an indication of reduction in the quantity of merchandise, while a second threshold (i.e., the re-stocking threshold) may be set to trigger a request for re-stocking of the merchandise. The warning threshold is typically set higher than the re-stocking threshold, and in certain embodiments, is set as an integer multiple of the re-stocking threshold. Continuing with the examples above, the warning threshold may be set, for example, to 50 units or 50% (i.e., 760 kg), which is twice the re-stocking threshold presented in the above examples.

The thresholds utilized by the system 10 are stored in a storage medium or database accessible by the system 10. In certain embodiments, the thresholds are stored in the storage medium 206 of the load status determination engine 202, while in other embodiments, the thresholds are stored as additional records in the database 210 which are read by the load status determination engine 202 and stored in volatile memory prior to executing the threshold comparisons. Still yet in other embodiments, the thresholds are stored on a remote server (e.g., a cloud server) that is accessible by the load status subsystem 200 through the network 20.

In embodiments in which the load status subsystem 200 and the stocking and control subsystem 300 are co-located, the communications modules 208, 302 may be implemented as interconnected data buses which allow the wired transfer of information between the load status subsystem 200 and the stocking and control subsystem 300. In embodiments in which the load status subsystem 200 and the stocking and control subsystem 300 are connected via a wired communication network (i.e., the network 20 includes at least one wired network), the communications modules 208, 302 may be implemented to transmit and receive data according to a wired communication protocol, which may include, for example, wired Internet protocols (e.g., TCP/IP). In embodiments in which the load status subsystem 200 and the stocking and control subsystem 300 are connected via a wireless communication network (i.e., the network 20 includes at least one wireless network, such as, for example, a wireless LAN or cellular network), the communications modules 208, 302 may be implemented to transmit and receive data according to a wireless communication protocol, such as, for example, Wi-Fi (e.g., IEEE802.11b, IEEE802.11g, etc.), cellular network protocols (e.g., CDMA, GSM, etc.), and the like.

According to certain embodiments, the stocking and control subsystem 300 includes a supply chain system 304, which maintains and manages shipping and logistics information pertaining to load carrying units loaded with merchandise. The supply chain system 304 is typically a computerized system having an operating system and processing hardware and software, and may provide supply chain information to the load status subsystem 200, which can be used by the load status determination engine 202 to adjust the re-stocking threshold.

According to certain embodiments, the stocking and control subsystem 300 includes an input module 306 allowing operators, for example, employees of the retail store 70, to set parameters of the system 10, including the records 1302-1318 of the database 210 and the thresholds. The input module 306 may be implemented as a computerized user interface system, that includes a computer or computer system, including an operating system and processing hardware and software, as well as user input devices, such as, for example, a keyboard and mouse for providing input to the computer system.

Figure 14:
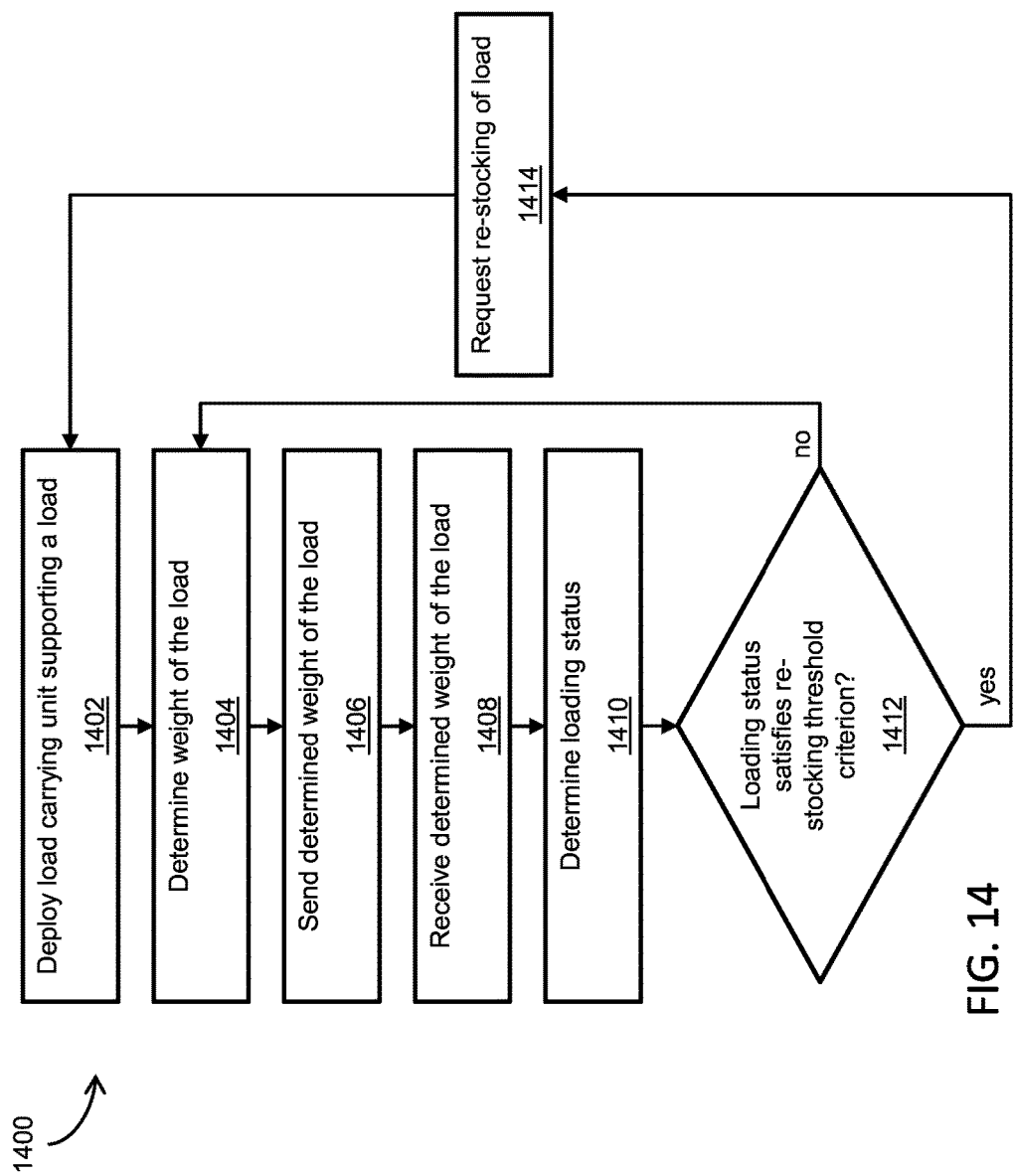
FIGS. 14-16 are flow diagrams illustrating processes to manage inventory, according to embodiments of the invention.

Attention is now directed to FIG. 14 which shows a flow diagram detailing a process 1400 in accordance with embodiments of the presently disclosed subject matter. Reference is also made to the elements shown in FIGS. 1-13. One or more of the process and the sub-processes of FIG. 14 are computerized processes performed by one or more of the weighing subsystem 100, the load status subsystem 200 and the stocking and control subsystem 300, including, for example, the processing unit 106, the load status determination engine 202, and associated components. The aforementioned processes and sub-processes are for example, performed automatically, but can be, for example, performed manually or semi-manually.

Note that the process 1400 is iterative in nature, as the weighing subsystem 100 can be configured to actuate the weight sensor 104 to determine the weight of the load of merchandise at periodic or intermittent time intervals as customers remove the merchandise 40 from the load carrying unit 30. In certain embodiments, the time intervals can be set by an operator (e.g., a retail store employee) of the system 10, via the input module 306. In principle, the weight sensor 104 can be actuated to determine the weight of the load of merchandise at time intervals as small as 5-10 seconds (i.e., weighing every 5-10 seconds), but in practice may be limited to a range between 1 minute at 1 hour.

The process 1400 begins at block 1402 where a load carrying unit, for example the load carrying unit 30, supporting and displaying a load of merchandise, is deployed in the retail display area 74 of the sales floor 72 in the retail store 70. The load carrying unit 30 may be pre-loaded with new merchandise and retrieved from the pre-sale storage area 76, prior to deployment in the retail display area 74. Alternatively, the load carrying unit 30 may be loaded with new merchandise in the pre-sale storage area 76 prior to deployment in the retail display area 74. Alternatively, the load carrying unit 30 may be deployed in the retail display area 74 directly from a delivery truck. As described above with reference to FIGS. 8-12, the load carrying unit 30 may be deployed directly on the floor 50 of the retail display area 74 of the sales floor 72, or may be deployed in the recess 60 in the floor 50.

The process 1400 then moves to block 1404, where the weighing subsystem 100, and in particular the weight sensor 104, determines the weight of the load of merchandise. As mentioned above, the actuation of the weight sensor 104 may be according to a set time interval. In block 1406, the determined weight is sent (e.g., transmitted) from the weighing subsystem 100, via the communications module 112, to the load status subsystem 200, where in block 1408, the determined weight is received by the load status subsystem 200, via the communications module 208.

After block 1408, the process 1400 moves to block 1410, where the load status subsystem 200, in particular the load status determination engine 202, determined the loading status of the load carrying unit 30 based on the received determined weight. As discussed above, the loading status indicates the quantity of merchandise remaining on the load carrying unit 30. The format of the loading status can be handled by the load status determination engine 202 as a number of units remaining on the load carrying unit 30 or as a percentage of merchandise remaining on the load carrying unit 30. The format of the loading status may be selected by an operator (e.g., a retail store employee) of the system 10, via the input module 306.

The process 1400 then moves to block 1412, where the load status determination engine 202 compares the loading status with the re-stocking threshold to determine if the loading status satisfies a re-stocking threshold criterion. Note that the format of the loading status and the format of the re-stocking threshold are linked, such that once the format of one is selected, via the input module 306 for example, the format of the other is also selected, automatically, to ensure that the loading status and the re-stocking threshold are in the same format.

If the loading status is below the re-stocking threshold, the re-stocking threshold criterion is satisfied, and the process 1400 moves to block 1414, where the load status determination engine 202 actuates the communications module 208 to send a re-stocking request to the communications module 302 of the stocking and control subsystem 300. The process 1400 then moves to block 1402, where a new load carrying unit, supporting and displaying a new load of merchandise, is deployed in the retail display area 74. In block 1412, if the loading status is above the re-stocking threshold, the re-stocking threshold criterion is not satisfied, and the process 1400 returns to block 1404.

Figure 15:
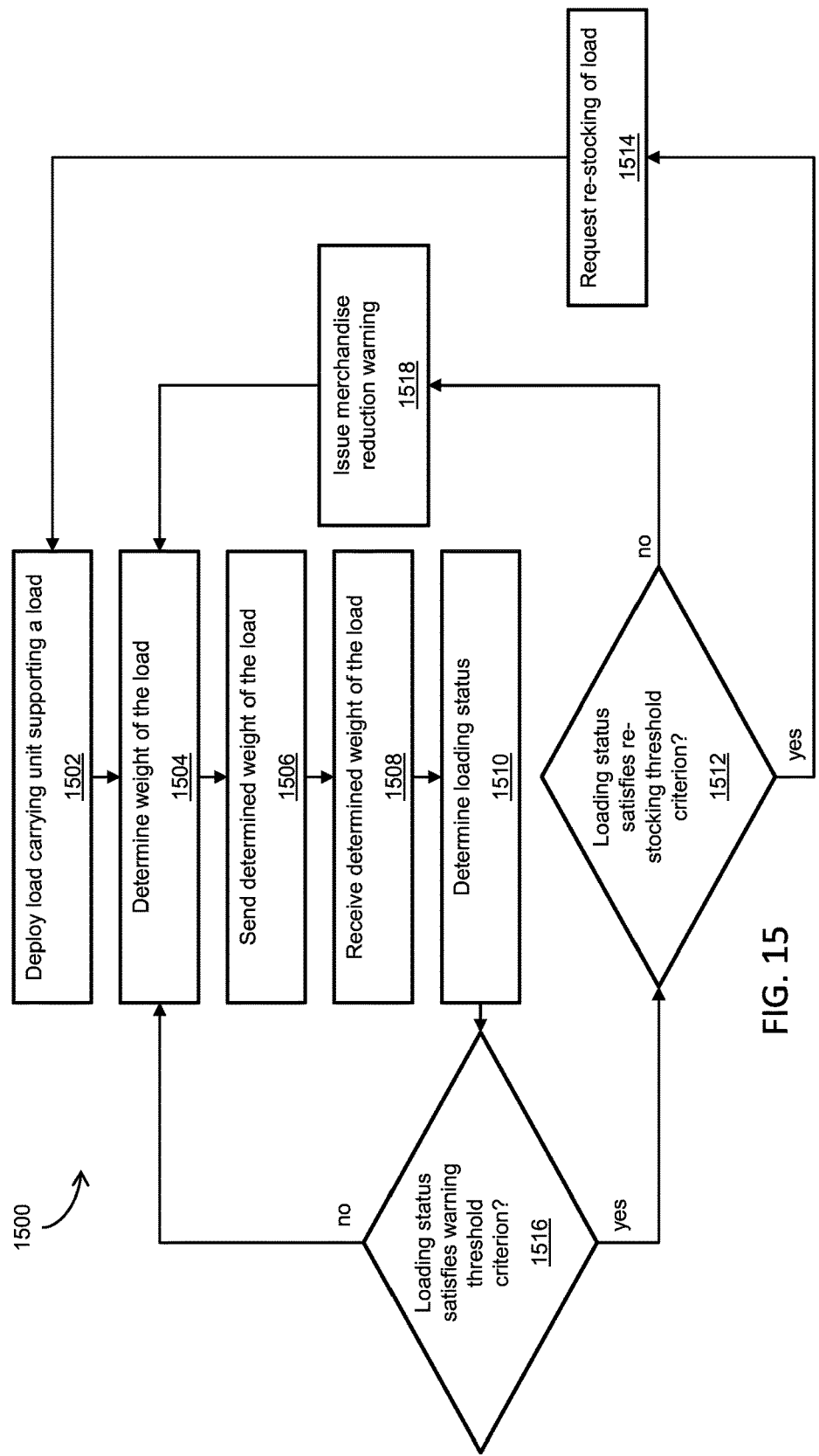

As discussed above, in some embodiments, the load status determination engine 202 may compare the quantity of merchandise remaining on the load carrying unit 30 to more than one threshold, specifically the warning threshold and the re-stock threshold. Attention is now directed to FIG. 15 which shows a flow diagram detailing a process 1500 in accordance with such embodiments of the presently disclosed subject matter. Blocks 1502-1510 of the process 1500 correspond to blocks 1402-1410 of the process 1400, and should be understood by analogy thereto. Therefore, the details of blocks 1502-1510 will not be repeated here.

With attention directed to block 1510, the process 1500 moves from block 1510 to block 1516, where the load status determination engine 202 compares the loading status with the warning threshold to determine if the loading status satisfies a warning threshold criterion. Note that in such embodiments, the format of the loading status, the format of the re-stocking threshold, and the format of the warning threshold are linked, such that once the format of one is selected, via the input module 306 for example, the format of the others are also selected, automatically, to ensure that the loading status and the thresholds are in the same format.

If the loading status is above the warning threshold, the warning threshold criterion is not satisfied, and the process 1500 returns to block 1504. If the loading status is below the warning threshold, the warning threshold criterion is satisfied, and the process 1500 moves to block 1512, where the load status determination engine 202 compares the loading status with the re-stocking threshold to determine if the loading status satisfies a re-stocking threshold criterion. If the loading status is below the re-stocking threshold, the re-stocking threshold criterion is satisfied, and the process 1500 moves to block 1514, where the load status determination engine 202 actuates the communications module 208 to send a re-stocking request to the communications module 302 of the stocking and control subsystem 300. The process 1500 then moves to block 1502, where a new load carrying unit, supporting and displaying a new load of merchandise, is deployed in the retail display area 74.

Returning to block 1512, if the loading status is above the re-stocking threshold, the re-stocking threshold criterion is not satisfied, and the process 1500 moves to block 1518, where the load status determination engine 202 actuates a linked or connected system to provide a warning or an indication of reduction in the quantity of merchandise. The warning or indication may be provided in various ways, for example as a visual indication on a video monitor or screen, or as an audio indication via a speaker or intercom system. The process 1500 then returns to block 1504.

As should be apparent, the embodiments of the system 10 of the present disclosure should not be limited to the load status determination engine 202 comparing the quantity of merchandise remaining on the pallet 30 to one or two thresholds, and embodiments are possible in which the load status determination engine 202 is configured to compare the quantity of merchandise remaining on the pallet 30 to multiple warning thresholds spaced at even or varying intervals.

Although embodiments of the system 10 as described thus far have pertained to the load status determination engine 202 performing comparisons of the quantity of merchandise remaining on the load carrying unit 30 to one or more thresholds to trigger a re-stocking request, other embodiments are possible in which additional comparison measures and/or thresholds are utilized to more effectively control re-stocking of the merchandise.

In one such embodiment, the load status determination engine 202 is configured to determine a load depletion rate of the load carrying unit 30. As mentioned above, the clock 116 provides time and/or date information which is used by the processing unit 106 to time tag the data collected by the weight sensor 104. As such, for each actuation of the weight sensor 104, the load status determination engine 202 receives both a measured weight and a time stamp associated with the measured weight. For clarity, the received measured weight is referred to hereinafter as a weight sample, and the time stamp associated with the weight sample is referred to hereinafter as a time sample. As the load status subsystem 200 receives weight samples from the weighing subsystem 100, the load status determination engine 202 calculates the load depletion rate based on the change between weight samples and the elapsed time between the associated time samples. For example, if after a first actuation of the weight sensor 104 a weight of $W_1$ is measured at a time of $T_1$, and after a second actuation of the weight sensor 104 a weight of $W_2$ is measured at a time of $T_2$, the load depletion rate can be calculated as $|W_2-W_1|/|T_2-T_1|$. The load depletion rate typically has units of unit weight per unit time, for example, kg per hour, but may also have units of percentage of the fully-loaded weight per unit time. As should be apparent, the load depletion rate can be calculated using multiple, i.e., more than two, samples, to generate an average load depletion rate.

The load depletion rate may be used in conjunction with the re-stocking threshold comparison methodology described above with reference to FIGS. 14 and 15 in order to hasten or delay the triggering of re-stocking requests. For example, in the process 1400 of FIG. 14, the load status determination engine 202 actuates the communications module 208 to send a re-stocking request if the loading status is below the re-stocking threshold, and does not actuate the communications module 208 to send a re-stocking request if the loading status is above the re-stocking threshold. However, if the load depletion rate is considerably low, the need for re-stocking may not be urgent, even if the loading status is below the re-stocking threshold. Similarly, if the load depletion rate is considerably high, the need for re-stocking may be urgent, even if the loading status is above the re-stocking threshold. For example, if the load status determination engine 202 receives a measured weight of 198 kg from the weighing subsystem 100 (which is below the re-stocking threshold), but the load depletion rate is determined to be 10 kg per hour, a re-stocking request may not be triggered. Conversely, if the load depletion rate is determined to be 50 kg per hour, a re-stocking request may be immediately triggered. In an additional example, if the load status determination engine 202 receives a measured weight of 396 kg from the weighing subsystem 100 (which is well above the re-stocking threshold), but the load depletion rate is determined to be 100 kg per hour, a re-stocking request may be immediately triggered.

As such, in embodiments in which the load status determination engine 202 is configured to determine the load depletion rate of the load carrying unit 30, the load status determination engine 202 utilizes the load depletion rate, preferably in addition to the re-stocking threshold, to trigger re-stocking requests, based on a comparison to a load depletion rate threshold. The load depletion rate threshold may be a dynamic threshold which changes as a function of the weight sample and the re-stocking threshold.

The above described load depletion rate may be one of multiple features used by the load status determination engine 202 to effectuate re-stocking triggering. Additional features may include, but are not limited to, time of day (supplied by the clock 116) relative to the operating hours of the retail store 70, weekday versus weekend shopping patterns, shopper occupancy level in the retail store 70, and external influences such as, for example, special promotions, weather, sporting events and/or concerts and/or festivals in proximity to the retail store 70. In certain embodiments, the load status determination engine 202 is configured to receive data descriptive of some or all of the above-mentioned features, and utilize the received data via data processing techniques in combination with one or more of the thresholding and load depletion rate methodologies described above. For example, if the load status determination engine 202 receives a measured weight that corresponds to a loading status below the re-stocking threshold, but also receives time of day data indicating that the retail store 70 is closed, the re-stocking request may be delayed or given a lower re-stocking priority. In addition, the data descriptive of such features may be used to adjust the re-stocking thresholds. For example, if the load status determination engine 202 receives data indicating that shopping volume increases by 25% on weekends compared to weekdays, and receives time of day data indicating a weekend, the re-stocking threshold may be raised to account for the increased shopping volume.

As discussed above, in order to exploit features to affect re-stocking decisions, in certain embodiments the load status determination engine 202 is configured to receive data descriptive of such features. As such, the system 10 is preferably connected to various data collection instruments or channels in order to properly receive such data. For example, in order to receive data related to sales history or weekday versus weekend shopping patterns, the system 10 may be connected to a point of sale (PoS) or point of purchase (PoP) system of the retail store 70, which performs and tracks retail transactions. As a further example, in order to receive data related to the shopper occupancy level in the retail store 70, the system 10 may be connected to a sensor or surveillance system deployed in the retail store 70 which can provide data from which occupancy estimates can be derived. For example, retail stores commonly use CCTV systems based on video cameras deployed throughout the retail store to provide video surveillance for security purposes. The video images collected by the CCTV system may be received by one or more of the processing systems of the system 10 (e.g., the processing unit 106 and/or the load status determination engine 202) to extract an occupancy estimate. As a further example, in order to receive data related to external influences (e.g., special promotions, weather, sporting events and/or concerts and/or festivals in proximity to the retail store 70), the system 10 may be connected, via the network 20, to one or more web servers that host web sites that provide information and content on such external influences.

As should be apparent to those skilled in the art, one or more of the above-mentioned features can be combined and used in conjunction with the aforementioned loading status thresholding methodology to enhance re-stocking effectiveness. Furthermore, the data descriptive of any of the above-mentioned features can be processed using artificial intelligence engines or statistical algorithms that utilize sales history or other historical data. In certain embodiments, statistical learning algorithms, which may be supervised or unsupervised, may be implemented to enhance the effectiveness of such features. The data descriptive of any of the above-mentioned features, and any thresholds associated with such features, are stored in a storage medium or database accessible by the system 10. In certain embodiments, such data and associated thresholds are stored in the storage medium 206 of the load status determination engine 202, while in other embodiments, such data and associated thresholds are stored as additional records in the database 210 which are read by the load status determination engine 202 and stored in volatile memory prior to executing the threshold comparisons. Still yet in other embodiments, such data and associated thresholds are stored on a remote server (e.g., a cloud server) that is accessible by the load status subsystem 200 through the network 20.

Figure 16:
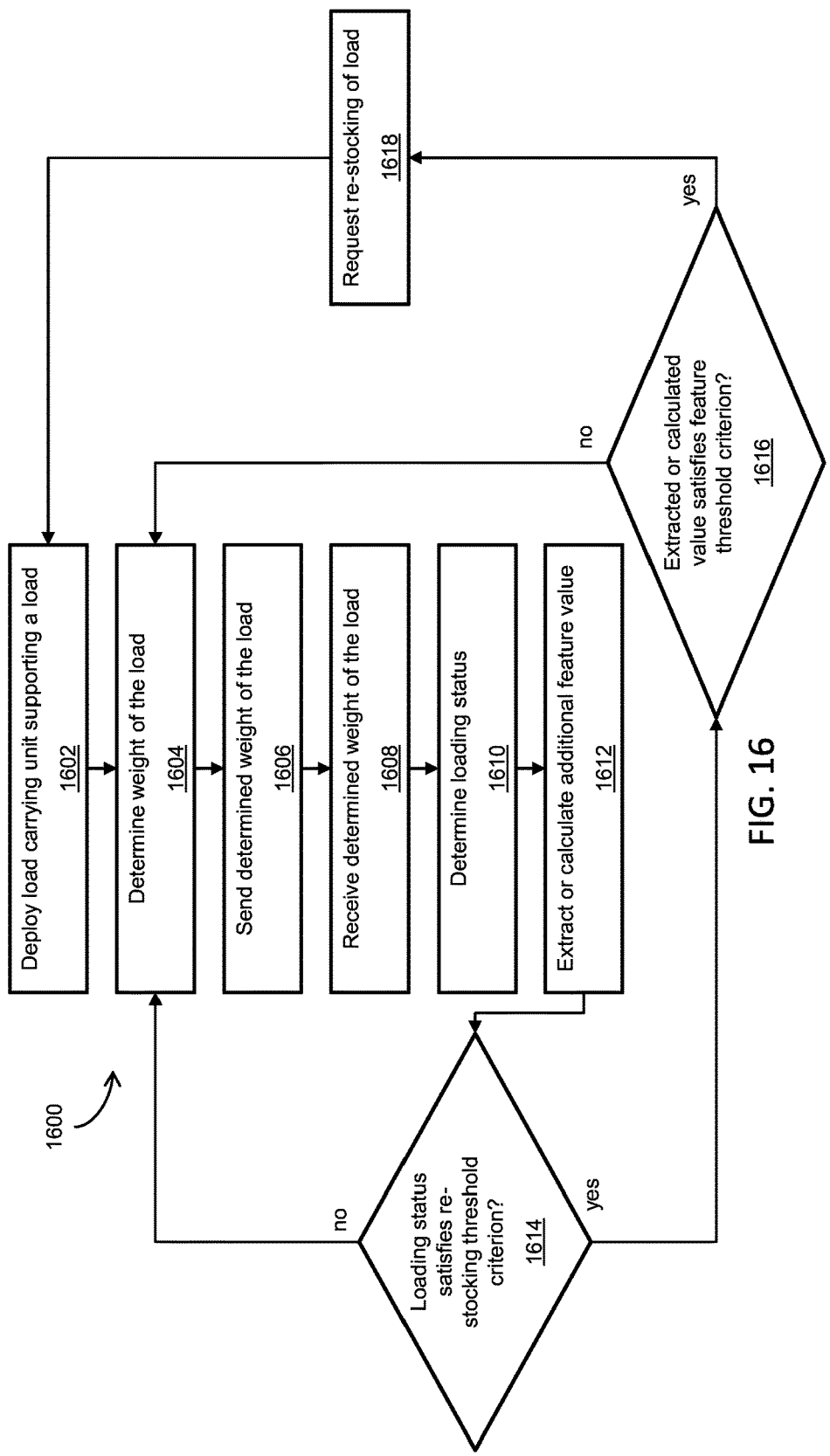

Attention is now directed to FIG. 16 which shows a flow diagram detailing a process 1600 in accordance with embodiments of the presently disclosed subject matter. Reference is also made to the elements shown in FIGS. 1-15. As with the processes and sub-processes of FIGS. 14 and 15, one or more of the process and the sub-processes of FIG. 16 are computerized processes performed by one or more of the weighing subsystem 100, the load status subsystem 200 and the stocking and control subsystem 300, including, for example, the processing unit 106, the load status determination engine 202, and associated components. The aforementioned processes and sub-processes are for example, performed automatically, but can be, for example, performed manually or semi-manually. In the process 1600, blocks 1602-1610 correspond to blocks 1402-1410 and 1502-1510 of the processes 1400 and 1500, respectively, and should be understood by analogy thereto. Therefore, the details of blocks 1602-1610 will not be repeated here.

With attention directed to block 1610, the process 1600 moves from block 1610 to block 1612, where the load status determination engine 202 determines one or more values associated with the above-mentioned features. The values are extracted or calculated from data descriptive of features received by the load status determination engine 202. In a non-limiting implementation, the data is the weight sample and time sample data, and the value is the calculated load depletion rate. The process 1600 then moves to block 1614, where the load status determination engine 202 compares the loading status with the re-stocking threshold to determine if the loading status satisfies a re-stocking threshold criterion. Note that block 1614 is generally similar to block 1412 of the process 1400. In block 1614, if the loading status is above the re-stocking threshold, the re-stocking threshold criterion is not satisfied, and the process 1600 returns to block 1604.

In block 1614, if the loading status is below the re-stocking threshold, the re-stocking threshold criterion is not satisfied, and the process 1600 moves to block 1616, where the load status determination engine 202 compares the value determined in block 1612 with a feature threshold. In the non-limiting implementation in which the value is the load depletion rate, the feature threshold in block 1616 is a load depletion rate threshold. In block 1616, if the value is above the feature threshold, the feature threshold criterion is satisfied, and the process 1600 moves to block 1618, where the load status determination engine 202 actuates the communications module 208 to send a re-stocking request to the communications module 302 of the stocking and control subsystem 300. If the value is below the feature threshold, the feature threshold criterion is not satisfied, and the process 1600 returns to block 1604. Note that although not shown in FIG. 16, if in block 1614 the loading status is above the re-stocking threshold, the process 1600 may move to block 1616, to account features which may contribute to more urgent re-stocking of the merchandise 40.

It is important to note that although block 1612 is illustrated as a single block that extracts or calculates a value from received data, block 1612 may represent the extraction or calculation of multiple values from various sets of received data. For example, block 1612 may perform the calculation of the load depletion rate, as well as extraction of information indicative of the time of day and the shopper occupancy level in the retail store 70. Similarly, although block 1616 is illustrated as a single block that performs a single threshold comparison, block 1616 may represent multiple threshold comparisons, the outcomes of which may be combined, averaged or weighted, to form an overall comparison outcome. For example, block 1616 may compare a calculated load depletion rate with a load depletion threshold, and subsequently or in parallel compare an extracted time of day with the opening hours of the retail store 70 and an occupancy threshold.

As a result of the execution of the process 1600, the load status determination engine 202 is able to control the transmission of re-stocking requests based on certain events. In view of the above described processes 1400, 1500 and 1600, such events include, for example, the loading status being below a re-stocking threshold level, the load depletion rate being above or below a load depletion rate threshold, a time of day being during or outside of operating hours of the retail store 70, a number of occupants in the retail store 70 being above or below an occupancy threshold, occurrences of special promotions, weather events, sporting events and/or concerts and/or festivals in proximity to the retail store 70, and time of day and/or day of week shopping patterns.

Note that the process 1600 may be modified to base the re-stocking requests only on the extracted or calculated values and comparison executed in blocks 1612 and 1616, and not on the comparison of the loading status with the re-stocking threshold in block 1614. For example, in the non-limiting implementation in which the value is the load depletion rate and the feature threshold in block 1616 is a load depletion rate threshold, the process 1600 may be modified to rely solely on the load depletion rate for triggering re-stocking requests.

Alternatively, the process 1600 may be modified to perform blocks in order different than illustrated in FIG. 16. In one example alternative, the process 1600 may move from block 1610 to block 1614, which may move to block 1604 or block 1612 depending on the decision outcome of block 1614. Block 1612 may then move to block 1616. In another example alternative, the dependency of the blocks may be changed such that decision block 1616 is executed before block 1614. For example, the process 1600 may move from block 1612 to block 1616, which may move to block 1604 or block 1614 depending on the decision outcome of block 1616. Block 1614 may then move to block 1604 or block 1618, depending on the decision outcome of block 1614.

As should be apparent to those skilled in the art, the processes and sub-processes illustrated in FIGS. 14-16 may be combined and modified with each other in order to adjust or modify the re-stocking requests triggers.

Although embodiments of the system 10 as described thus far have pertained to a weighing subsystem that measures the weight of a load supported by a load carrying unit, and provides the measured weight to a load status subsystem in order to determine a loading status of the load carrying unit, other embodiments are possible in which a plurality of weighing subsystems, each coupled to one or more different load carrying units, are deployed to provide measured weight of different respective loads to the load status subsystem.

Figure 17:
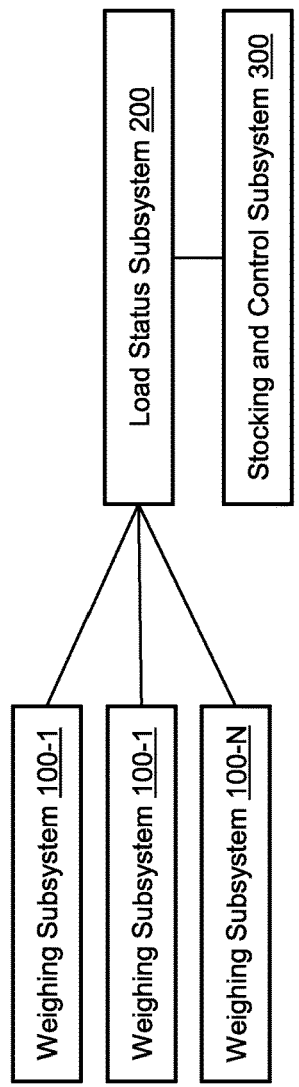
FIG. 17 is a block diagram of a plurality of weighing subsystems, each linked to the load status subsystem and the stocking and control subsystem, according to an embodiment of the invention.

Refer now to FIG. 17, a block diagram of a collection of weighing subsystems 100-1, 100-2, and 100-N connected to the load status subsystem 200 and the stocking and control subsystem 300. The structure and operation of each of the weighing subsystems 100-1, 100-2, and 100-N is generally similar to that of the weighing subsystem 100, and should be understood by analogy thereto. Although not illustrated in FIG. 17, the connections between the weighing subsystems 100-1, 100-2, and 100-N, the load status subsystem 200, and the stocking and control subsystem 300 may be performed over a network, for example, the network 20, similar to as illustrated in FIG. 5. Also note that the depiction of three weighing subsystems in FIG. 17 is for illustration purposes only, and in principle the number of weighing subsystems may be on the order of tens, hundreds or thousands.

In the embodiment illustrated in FIG. 17, each of the weighing subsystems 100-1, 100-2, and 100-N may include a unique identifier for identifying a particular weighing subsystem, and the database 210 may include the unique identifiers as an additional data record. In this way, the load status subsystem 200 is able to determine the loading status, and perform the thresholding and re-stocking described in the processes 1400, 1500, and 1600 in FIGS. 14, 15 and 16, respectively, uniquely for each of the weighing subsystems 100-1, 100-2, and 100-N.

Although embodiments of the system 10 as described thus far have pertained to a weighing system 100 having a sensor arrangement 102 that includes one or more weight sensors 104, other embodiments are possible in which the sensor arrangement includes various types of sensors, where each of the sensors is operative to measure or determine a different feature related to the load carrying unit 30 and/or the merchandise 40. For example, the sensor arrangement 102 may include a tilt sensor integrated with the load carrying unit 30 for measuring the tilt, for example as an angle, relative to the plane of the floor 50. The tilt sensor may be implemented in various ways, for example, as an accelerometer. In an additional example, the sensor arrangement 102 may include a temperature sensor for measuring the temperature in the vicinity of the load carrying unit 30. The temperature sensor may be implemented in various ways, for example, as a thermistor.

The above mentioned additional sensors provide electrical signals indicative of measured values which may be provided to the processing unit 106 for processing. Such processing may include analyzing the measured values to determine if the measured values are within a specified tolerance. For example, the processing unit 106 may determine, as a result of the analyzing, whether the load carrying unit 30 is positioned at an incline based on the measurements from the tilt sensor, or whether the temperature in the vicinity of the load carrying unit 30 is outside of a preferred storage range for the merchandise supported by the load carrying unit 30.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The block diagrams in the drawings illustrate the architecture, functionality, and operation of possible implementations of systems, devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An inventory management system, comprising:
   a floor-based weighing subsystem comprising a sensor arrangement including at least one weight sensor functionally associated with a load carrying unit supporting a load having an associated weight, the load carrying unit deployed at the floor of a retail display area, and the weight sensor determining the weight of the load; and
   a load status subsystem comprising a load status determination engine including at least one processor coupled to a storage medium, the load status determination engine configured to:
      receive, from the floor-based weighing subsystem, the weight of the load determined by the weight sensor,
      determine a loading status of the load carrying unit based on the received weight of the load,
      send a request to replace the load carrying unit in response to at least one event, wherein the at least one event includes the determined loading status of the load carrying unit satisfying a threshold criterion, and
      determine a load depletion rate based on the determined loading status.

2. The inventory management system of claim 1, wherein the at least one event further includes the load depletion rate satisfying a threshold criterion.

3. The inventory management system of claim 1, wherein the at least one event is derived from at least one of temporal data associated with the retail display area, temporal data associated with the location of the retail display area, and occupancy of the retail display area.

4. The inventory management system of claim 1, wherein the weight sensor is positioned in a recess in the floor defined in part by a recess surface.

5. The inventory management system of claim 1, further comprising:
   a stocking and control subsystem configured to receive, from the load status subsystem, an actuation command to take at least one action in response to the determined loading status of the load carrying unit.

6. The inventory management system of claim 1, wherein the load includes a bottled beverage product.

7. The inventory management system of claim 1, wherein the weight sensor is carried by a surface of the load carrying unit.

8. The inventory management system of claim 7, wherein the surface of the load carrying unit is a furthest surface of the load carrying unit from the floor.

9. The inventory management system of claim 7, wherein the surface of the load carrying unit is a nearest surface of the load carrying unit to the floor.

10. The inventory management system of claim 1, wherein at least one surface of the load carrying unit is positioned in a recess in the floor, the recess defined in part by a recess surface.

11. The inventory management system of claim 10, wherein the weight sensor is interposed between the recess surface and the at least one surface of the load carrying unit.

12. The inventory management system of claim 10, wherein the weight sensor is positioned outside of the recess.

13. The inventory management system of claim 1, further comprising a database storing weight information associated with the load and the load carrying unit.

14. The inventory management system of claim 13, wherein the weight information associated with the load carrying unit includes an unloaded weight of the load carrying unit and a fully-loaded weight of the load carrying unit.

15. The inventory management system of claim 13, wherein the weight information associated with the load includes a list of load types, and for each load type, a mapping between weight and a number of units of the load.

16. The inventory management system of claim 13, wherein the load status determination engine is further configured to:
   receive, from the database, weight information associated with the load and the load carrying unit.

17. The inventory management system of claim 16, wherein the weight information associated with the load carrying unit includes an unloaded weight of the load carrying unit and a fully-loaded weight of the load carrying unit, and wherein the loading status of the load carrying unit is determined, by the load status determination engine, as a percentage unit based on the unloaded weight and the fully-loaded weight of the load carrying unit.

18. The inventory management system of claim 16, wherein the weight information associated with the load includes a list of load types, and for each load type, a mapping between weight and a number of units of the load, and wherein the loading status of the load carrying unit is determined, by the load status determination engine, by correlating the weight of the load with the number of units of the load based on the mapping.

19. An inventory management system, comprising:
   a floor-based weighing subsystem comprising a sensor arrangement including at least one weight sensor functionally associated with a load carrying unit supporting a load having an associated weight, the load carrying unit deployed at the floor of a retail display area, and the weight sensor determining the weight of the load, wherein at least one surface of the load carrying unit is positioned in a recess in the floor, the recess defined in part by a recess surface; and
   a load status subsystem comprising a load status determination engine including at least one processor coupled to a storage medium, the load status determination engine configured to:

receive, from the floor-based weighing subsystem, the weight of the load determined by the weight sensor, and determine a loading status of the load carrying unit based on the received weight of the load.

20. The inventory management system of claim 19, wherein the weight sensor is interposed between the recess surface and the at least one surface of the load carrying unit.

21. The inventory management system of claim 19, wherein the weight sensor is positioned outside of the recess.

22. An inventory management system, comprising:
a floor-based weighing subsystem comprising a sensor arrangement including at least one weight sensor functionally associated with a load carrying unit supporting a load having an associated weight, the load carrying unit deployed at the floor of a retail display area, and the weight sensor determining the weight of the load, wherein the weight sensor is positioned in a recess in the floor defined in part by a recess surface; and
a load status subsystem comprising a load status determination engine including at least one processor coupled to a storage medium, the load status determination engine configured to:
receive, from the floor-based weighing subsystem, the weight of the load determined by the weight sensor, and
determine a loading status of the load carrying unit based on the received weight of the load.

23. An inventory management system, comprising:
a floor-based weighing subsystem comprising a sensor arrangement including at least one weight sensor functionally associated with a load carrying unit supporting a load having an associated weight, the load carrying unit deployed at the floor of a retail display area, and the weight sensor determining the weight of the load;
a database storing weight information associated with the load and the load carrying unit; and
a load status subsystem comprising a load status determination engine including at least one processor coupled to a storage medium, the load status determination engine configured to:
receive, from the floor-based weighing subsystem, the weight of the load determined by the weight sensor,
receive, from the database, weight information associated with the load and the load carrying unit, wherein the weight information associated with the load carrying unit includes an unloaded weight of the load carrying unit and a fully-loaded weight of the load carrying unit, and
determine a loading status of the load carrying unit based on the received weight of the load, wherein the loading status of the load carrying unit is determined as a percentage based on the unloaded weight and the fully-loaded weight of the load carrying unit.

* * * * *